US005825383A

United States Patent [19]

Abe et al.

[11] Patent Number: 5,825,383

[45] Date of Patent: Oct. 20, 1998

[54] INK JET HEAD COMPACT AND ALLOWING INK TO BE DISCHARGED WITH GREAT FORCE BY USING DEFORMABLE STRUCTURE

[75] Inventors: Shingo Abe, Tenri; Tetsuya Inui, Nara; Hirotsugu Matoba, Sakurai; Susumu Hirata, Ikoma; Masaharu Kimura, Daitou; Yorishige Ishii, Yamatotakada; Hajime Horinaka, Kashiba; Hiroshi Onda, Yamatokooriyama, all of Japan

[73] Assignee: Sharp Kabushiki Kaisha, Osaka, Japan

[21] Appl. No.: 442,701

[22] Filed: May 17, 1995

[30] Foreign Application Priority Data

Dec. 20, 1994 [JP] Japan .................................... 6-316743

[51] Int. Cl.[6] ..................................................... G01D 15/18

[52] U.S. Cl. ................................................ 347/54; 347/70

[58] Field of Search ........................................... 347/54, 70

[56] References Cited

U.S. PATENT DOCUMENTS

| | | | |
|---|---|---|---|
| 4,480,259 | 10/1984 | Kruger et al. | 346/140 R |
| 4,546,362 | 10/1985 | Koto | 346/140 R |
| 5,530,465 | 6/1996 | Hasegawa et al. | 347/70 |
| 5,534,900 | 7/1996 | Ohno et al. | 347/54 |

FOREIGN PATENT DOCUMENTS

| | | |
|---|---|---|
| 0608835 A2 | 8/1994 | European Pat. Off. . |
| 63-297052 | 12/1988 | Japan . |
| 2-30543 | 1/1990 | Japan . |

OTHER PUBLICATIONS

Patent Abstracts of Japan, vol. 016, No. 416 (M–1304), 2 Sep. 1992 & JP–A–04 141429 (Seiko Epson Corp) 14 May 1992.

Patent Abstracts of Japan, vol. 016, No. 135 (M–1230), 6 Apr. 1992 & JP–A–03 295655 (Seiko Epson Corp) 26 Dec. 1991.

Patent Abstracts of Japan, vol. 005, No. 076 (M–069), 20 May 1981 & JP–A–56 025464 (Canon Inc) 11 Mar. 1981.

Patent Abstracts of Japan, vol. 014, No. 323 (M–0997), 11 Jul. 1990 & JP–A–02 108544 (Seiko Epson Corp) 20 Apr. 1990.

Patent Abstracts of Japan, vol. 016, No. 149 (M–1234), 13 Apr. 1992 & JP–A–04 005051 (Seiko Epson Corp) 9 Jan. 1992.

Patent Abstracts of Japan, vol. 016, No. 503 (M–1326), 16 Oct. 1992 & JP–A–04 185348 (Seiko Epson Corp) 2 Jul. 1992.

Patent Abstracts of Japan, vol. 016, No. 137 (M–1231), 7 Apr. 1992 & JP–A–03 297653 (Seiko Epson Corp) 27 Dec. 1991.

*Primary Examiner*—Daniel P. Malley
*Attorney, Agent, or Firm*—Nixon & Vanderhye PC

[57] ABSTRACT

An ink jet head, having a long life, capable of discharging ink with a strong force and at a high speed is provided at a small size. A container comprises a casing and a nozzle plate covering the upper surface of the casing and an ink discharge opening. A buckling structure is fixed at its longitudinal ends to the bottom surface of the container via an installing member, and its center portion can be deformed upward by buckling. A diaphragm is positioned above the buckling structure with a space therebetween and placed on an inner wall of the casing with its periphery fixed thereto so as to liquid-tightly partition the inside of the container into a space and an ink chamber. A connection member connects the diaphragm and the buckling structure at their center. Electrodes are provided at both ends of the buckling structure to generate thermal stress therein by supplying electric current for buckling and consequently to apply pressure to ink in the ink chamber for discharging.

12 Claims, 18 Drawing Sheets unit: μm

INK JET HEAD COMPACT AND ALLOWING INK TO BE DISCHARGED WITH GREAT FORCE BY USING DEFORMABLE STRUCTURE

BACKGROUND OF THE INVENTION

1. Field of the Invention

The present invention relates to an ink jet head for carrying out printing by applying pressure to ink stored inside a container so as to discharge the ink to the outside as ink droplets.

2. Description of the Prior Art

A conventional ink jet head of this kind has advantages of performing printing at a comparatively high speed without making a lot of noise and enables a printer to miniaturize and facilitates color printing. Various ink jet heads based on the principle of droplet discharge are manufactured. The following methods utilizing the principle of droplet discharge are known: The mechanical deformation of a piezoelectric element is utilized to discharge ink from a nozzle opening of an ink chamber (piezoelectric element method); and ink is boiled to generate bubbles by heating a heater so as to discharge the ink from a nozzle opening owing to a pressure change caused by the generation of bubbles (bubble jet method).

The conventional ink jet head has, however, problems as described below. That is, in an ink jet head adopting the piezoelectric element method, a piezoelectric element is deformed by applying a voltage thereto. But the deformation amount of the piezoelectric element is small. Thus, in discharging ink droplets, piezoelectric elements are laminated on each other or a large piezoelectric actuator of bimorph type is formed to make the deformation amount of the piezoelectric elements larger. Thus, piezoelectric elements and an ink chamber much larger than a nozzle pitch are required. Hence, it is difficult to manufacture a multi-nozzle (nozzle-concentrated) head.

In the bubble jet method, bubbles formed when the ink has been boiled by heating the heater are utilized. Thus, it is comparatively easy to concentrate the nozzles in a space due to the miniaturization of the heater and thereby reduce a recording time period. But it is necessary to heat the heater to approximately 1000° C. in a short period of time to obtain complete bubbles. Consequently, the heater is deteriorated in a short period of time and thus the ink jet head has a short life.

In addition, there is proposed an ink jet head adopting a method of applying pressure to ink in an ink chamber and discharging it by means of a buckling structure which is deformed by thermal stress generated owing to heat generation caused by supplying electric current thereto Japanese Patent Laid-open Publication No. 2-30543). The ink jet head is not provided with a diaphragm. Thus, ink flows even to the rear side of the buckling structure when pressure is applied to the ink. As a result, pressure cannot be applied to the ink at a high degree and consequently, the ink is discharged with a weak force and at a low speed.

The object of the present invention is therefore to provide an ink jet head, having a long life, capable of discharging ink with a strong force and at a high speed while having a small dimension. It is another object of the present invention to provide an ink jet head, especially a buckling structure, capable of generating a great buckling energy so as to discharge the ink efficiently.

SUMMARY OF THE INVENTION

In order to achieve the aforementioned object, there is provided an ink jet head comprising:

- a container having an ink discharge opening on a wall thereof;
- a structure being deformable and having portions which form both ends thereof in at least one direction and which are fixed to a wall surface inside the container;
- a diaphragm which keeps an ink chamber liquid-tightly and which is deformable toward the ink chamber and which is positioned above the deformable structure with a space therebetween and which is connected at least partly with the deformable structure; and
- compression means, provided in the container, for deforming the deformable structure so as to discharge ink in the ink chamber from the ink discharge opening by applying pressure to ink.

The ink jet head having the construction is driven as follows: That is, the compression means provided in the space on the structure-provided side causes the structure to generate a compression load in the plane thereof, thus deforming the structure largely in a direction perpendicular to the plane. As a result, the diaphragm connected with the structure is deformed toward the ink discharge opening. Consequently, the ink in the ink chamber partitioned liquid-tightly from the space on the structure-provided side is compressed and discharged to the outside as droplets from the ink discharge opening formed on the wall of the container. When the compression load has been removed by the compression means from the structure, the structure and the diaphragm are returned to the original state of deformation-free. The droplets discharged to the outside by the repeated applications and removals of the compression load to the structure by means of the compression means perform printing on a recording sheet of paper.

Since portions forming both ends in at least one direction of the deformable structure are fixed to the inner wall of the container, the compression load can deform the structure in a large amount in the vertical direction, even if the load deforms the structure in a small amount in the horizontal direction. Therefore, the structure can be simply constructed and has small dimensions, besides a great ink-discharge force can be obtained. Further, there is provided the diaphragm keeping the ink chamber liquid-tightly and connected with the structure with a space therebetween. Thus, the ink can be prevented from leaking into the space on the structure-provided side. In addition, since the ink can be compressed by the diaphragm having a large area, a great discharge force can be obtained.

Also, there is provided an ink jet head comprising:

- a container having an ink discharge opening on a wall thereof;
- a buckling structure being deformable toward the ink discharge opening and having portions which form both ends thereof in at least one direction and which are fixed to a wall surface opposed to the wall of the container;
- a diaphragm which is positioned above the buckling structure with a space therebetween and which liquid-tightly partitions the inside of the container into a space on the buckling structureside and an ink chamber on the ink discharge openingside and which is deformable toward the ink chamber;
- a connection member for connecting the diaphragm and the buckling structure with each other in the vicinity of the center thereof; and
- compression means, provided in the space, for causing the buckling structure to buckle by generating a compression load therein so as to discharge ink in the ink chamber from the ink discharge opening by applying pressure to ink.

The ink jet head having the construction is driven as follows: That is, the compression means provided in the space on the buckling structure-provided side causes the buckling structure to generate a compression load in the plane thereof, thus deforming the buckling structure largely in a direction perpendicular to the plane. As a result, the diaphragm connected with the buckling structure is deformed toward the ink discharge opening. Consequently, the ink in the ink chamber partitioned liquid-tightly from the space on the buckling structure-provided side is compressed and discharged to the outside as droplets from the ink discharge opening formed on the wall of the container. When the compression load has been removed by the compression means from the buckling structure, the buckling structure and the diaphragm are returned to the original state of deformation-free. The droplets discharged to the outside by the repeated applications and removals of the compression load to the buckling structure by means of the compression means perform printing on a recording sheet of paper.

Since the opposed peripheral portions in one direction of the buckling structure are fixed to the inner wall of the container, the compression load can deform the structure in a large amount in the vertical direction, even if the load deforms the buckling structure in a small amount in the horizontal direction. Therefore, the buckling structure can be simply constructed and has small dimensions, besides a great ink-discharge force can be obtained. Further, there is provided the diaphragm keeping the ink chamber liquid-tightly and connected with the buckling structure with a space therebetween by a connection member. Thus, the ink can be prevented from leaking into the space on the buckling structure-provided side. In addition, since the ink can be compressed by the diaphragm having a large area, a great discharge force can be obtained.

In an embodiment, a plurality of connection members for connecting the diaphragm and the buckling structure with each other in the vicinity of the center thereof is provided. Therefore, a load is dispersedly applied to the diaphragm and hence, stress is decreasingly generated therein. Thus, the longevity of the diaphragm can be prolonged.

In an embodiment, a plurality of rectangular strips project radially from the center of the buckling structure; and opposed peripheral portions of the diaphragm in at least one direction are fixed to an inner wall of the container. Accordingly, a great energy can be stored per unit buckling deformation of a plurality of rectangular strips. Consequently, the diaphragm can be deformed in a large amount, thus providing a great ink-discharge force.

In an embodiment, the diaphragm is not connected with any members other than the buckling structure via the connection member. Hence, stress is decreasingly generated in the diaphragm, with the ink chamber being maintained liquid-tightly. Thus, the longevity of the diaphragm can be prolonged.

Also, there is provided an ink jet head comprising:

a container having an ink discharge opening on a wall thereof;

a buckling structure comprising two or more pairs of rectangular strips which are radially projected straight from a center thereof, leading ends of which are fixed to a wall surface opposed to the wall of the container and which are deformable toward the ink discharge opening;

a diaphragm which is positioned above the buckling structure with a space therebetween such that portions forming both ends in at least one direction are fixed to an inner wall of the container so as to liquid-tightly partition inside of the container into a space on a buckling structureside and an ink chamber on the ink discharge openingside and which is deformable toward the ink chamber;

a connection member for connecting the diaphragm and the buckling structure with each other at the center thereof; and compression means, provided in the space, for causing the buckling structure to buckle by generating thermal stress therein with supply of electric current, so that ink is discharged from the ink discharge opening by applying pressure to the ink in the ink chamber, wherein assuming that Young's modulus of each rectangular strip constituting the buckling structure is E; the width thereof is b; the thickness thereof is h; the coefficient of linear expansion thereof is α; the length of a pair of rectangular strips is l; the total number of pairs of rectangular strips is n; the temperature change in the buckling structure at the time of buckling is t; and the spring constant of the diaphragm is k, the thickness (h) of the rectangular strip satisfies an equation expressed below to generate a buckling energy:

$$2\,l(-p)\cos(u/3+4\pi/3)<h<2\,l(-p)\cos(u/3)$$

where $$p=-\alpha t/\pi^2,\ q=3k/nEb\pi^4,\ u=\cos^{-1}\{q/p(-p)^{1/2}\},\ 0<u<\pi$$

In the ink jet head having the construction, thermal stress is generated in the buckling structure by the supply of electric current via compression means to buckle the buckling structure. Further, an ink jet head capable of generating a buckling energy necessary for pressurizing ink can be designed by setting the thickness of the rectangular strip constituting the buckling structure to the range specified in the equation.

In an embodiment, an ink jet head capable of generating a buckling energy ($U_1-U_2$) necessary for discharging ink droplets can be designed by setting the thickness (h) of the rectangular strip to the range specified in the equation shown below:

$$U_1-U_2=(3nEbhl^2\alpha t\pi^2-nEbh^3\pi^4-6\,l^3k)^2/18nEbhl^3\pi^4>mv^2/2+\sigma S+8\pi\mu L^2v$$

where

σ: surface tension of the ink, μ: the viscosity coefficient of ink, m: the mass of an ink droplet, v: the discharge speed of ink droplet, S: the surface area of ink droplet, L: the length of the ink discharge opening.

In an embodiment, an ink jet head capable of generating a maximum buckling energy necessary for discharging ink droplets can be designed by setting the thickness (hs) of the rectangular strip to the range specified by the equation shown below:

$$hs=l\{-s+(s^2+r^3)^{1/2}\}^{1/3}+l\{-s-(s^2+r^3)^{1/2}\}^{1/3};\ \text{when } s^2+r^3>0;\ hs=2\,l(-r)\cos(w/3);\ \text{when } s^2+r^3<0$$

where $$r=-\alpha t/5\pi^2,\ s=-3k/5nEb\pi^4,\ w=\cos^{-1}\{s/r(-r)^{1/2}\},\ 0\leqq w\leqq\pi$$

Further, there is provided an ink jet head comprising:

a container having an ink discharge opening on a wall thereof;

- a buckling structure comprising two or more pairs of rectangular strips which are radially projected straight from a center thereof, leading ends of which are fixed to a wall surface opposed to the wall of the container and which are deformable toward the ink discharge opening;
- a diaphragm which is positioned above the buckling structure with a space therebetween such that portions forming both ends in at least one direction are fixed to an inner wall of the container so as to liquid-tightly partition inside of the container into a space on a buckling structureside and an ink chamber on the ink discharge openingside and which is deformable toward the ink chamber;
- a connection member for connecting the diaphragm and the buckling structure with each other at the center thereof; and
- compression means, provided in the space, for causing the buckling structure to buckle by generating thermal stress therein with supply of electric current, so that ink is discharged from the ink discharge opening by applying pressure to ink in the ink chamber,
- wherein assuming that Young's modulus of each rectangular strip constituting the buckling structure is E; the width thereof is b; the thickness thereof is h; the coefficient of linear expansion thereof is α; the entire length of a pair of rectangular strips is C; the effective length of a pair of rectangular strips excluding the center thereof is l; the total number of pairs of rectangular strips is n; the temperature change in the buckling structure at the time of buckling is t; and the spring constant of the diaphragm is k, the width (b) of the rectangular strip is given by an equation shown below; and the effective length (l) satisfies an equation expressed below to generate a buckling energy:

$$b=(C-l)/\tan\{(n-1)\pi/2n\}(3nEbhl^2\alpha t\pi^2-nEbh^3\pi^4-6\,l^3k)^2/3nEbhl^3\pi^4>0$$

According to the construction, the ink jet head capable of generating a buckling energy necessary for applying pressure to ink can be designed by setting the width (b) of the rectangular strip shown by the equation and the effective length (l) of each pair of rectangular strips to the range specified by the equation.

In an embodiment, an ink jet head capable of generating a buckling energy necessary for discharging ink droplets can be designed by setting the effective length (l) of each pair of rectangular strips to the range specified by the equation shown below:

$$(3nEbhl^2\alpha t\pi^2-nEbh^3\pi^4-6\,l^3k)^2/18nEbhl^3\pi^4>mv^2/2+\sigma S+8\pi\mu L^2v$$

In an embodiment, an ink jet head capable of generating a maximum buckling energy necessary for discharging ink droplets can be designed by setting the effective length (l) of each pair of rectangular strips to the range specified by the equation shown below:

$$d\{(3nEbhl^2\alpha t\pi^2-nEbh^3\pi^4-6l^3k)^2/18nEbhl^3\pi^4\}/dl=0$$

DETAILED DESCRIPTION OF THE PREFERRED EMBODIMENTS

The embodiment of the present invention is described below in detail with reference to drawings.

Figure 1A:
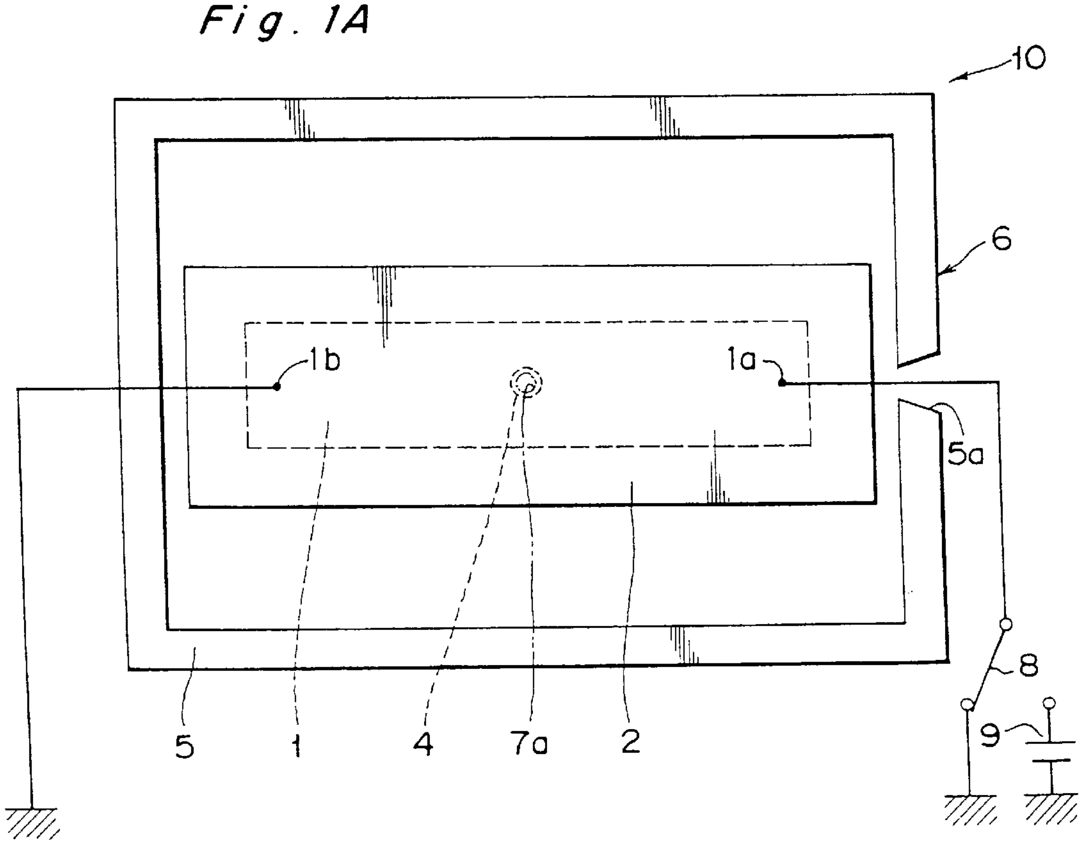
FIGS. 1A and 1B are a plan view and a sectional view, respectively showing an embodiment of an ink jet head described in claims 1 and 6.
Figure 1B:
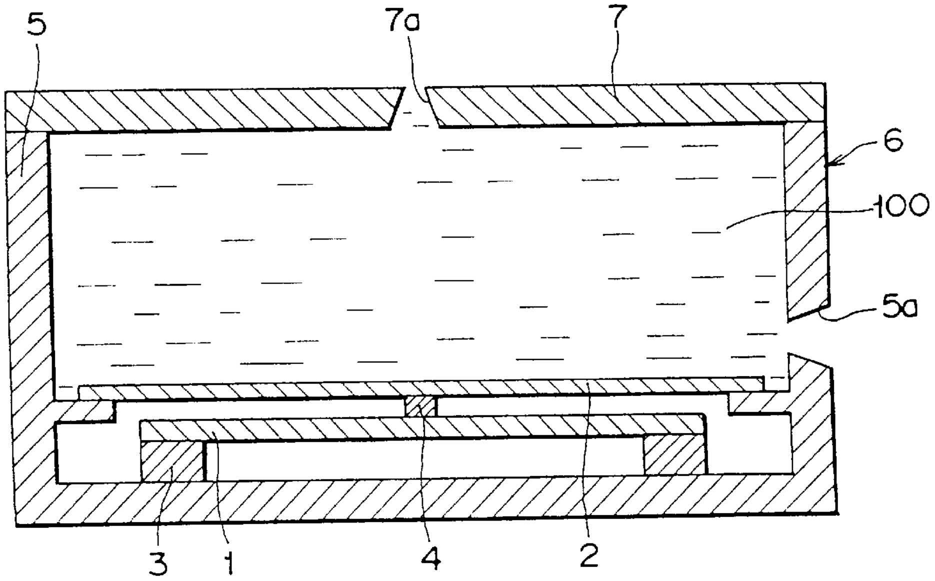

FIGS. 1A and 1B are a plan view and a sectional view, respectively showing an embodiment of an ink jet head. An ink jet head 10 comprises a container 6 having a casing 5 and a nozzle plate 7 covering the upper surface of the casing 5 and having an ink discharge opening 7*a* at the center thereof. A rectangular plate-shaped buckling structure 1, has ends that are fixed to the bottom surface of the container 6, opposed to the nozzle plate 7 via an installing member 3 and the center portion of which can be deformed upward by buckling. A diaphragm 2 is positioned above (in FIG. 1A) the buckling structure 1 with a space therebetween and placed on an inner horizontal wall of the casing 5, with the periphery of the diaphragm being fixed so as to liquid-tightly partition the inside of the container 6 into a lower space and an upper ink chamber. The diaphragm 2 is deformable upward as shown in FIG. 1B. A connection member 4 corrects the diaphragm 2 and the buckling structure 1 at their center, and a compression unit comprising an electrode 1*a* provided at one end of the buckling structure 1 to be connected with an external power source 9 via a switch 8 and an electrode 1*b* provided at the other end of the buckling structure 1 to be connected with the ground, causes the buckling structure 1 to generate thermal stress therein by the supply of electric current so as to buckle the buckling structure 1 and thus apply pressure to ink 100 stored in an ink chamber via the diaphragm 2 in order to discharge the ink 100 from the ink discharge opening 7*a*. The plan view of FIG. 1A has been drawn in the state in which the nozzle plate 7 has been removed from the ink jet head 10.

The buckling structure 1 is composed of a material such as metal which is elastically deformed and conductive. Upon turn-on of the switch 8, electric current is supplied from the power source 9 to the buckling structure 1, which in turn tends to expand by heating and temperature-rising. But, the longitudinal expansion of the buckling structure 1 is prevented by the installing member 3 provided at its both ends. As a result, thermal stress is generated in the plane of buckling structure 1, thus deforming the buckling structure 1 vertically upward by buckling. When the supply of electric current is stopped by the turn-off of the switch 8, the buckling structure 1 is contracted due to cooling, thus being returned to the original state. The configuration and dimension of the buckling structure 1 suitable for the discharge of ink are described in detail with reference to FIG. 11A and the following Figs.

Both longer sides of the diaphragm 2 and the shorter sides thereof, namely, the four sides thereof are fixed to the inner horizontal wall of the casing 5, thus partitioning the ink chamber liquid-tightly.

The ink discharge opening 7*a* is tapered toward the outside, and an ink supply opening 5*a* communicating with the lower portion of the ink chamber is formed on a side wall of the casing 5.

Figure 2A:
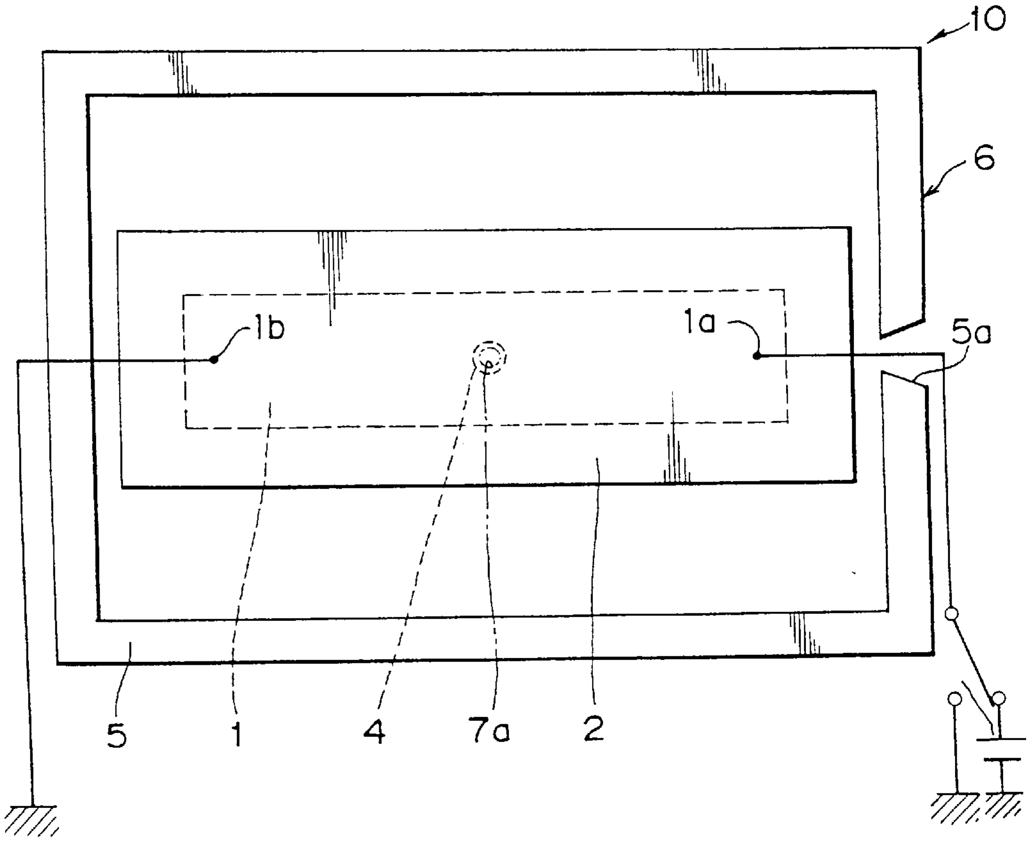
FIGS. 2A and 2B are a plan view and a sectional view, respectively showing the embodiment of the ink jet head shown in FIGS. 1A and 1B showing a state in which the buckling structure has been deformed.
Figure 2B:
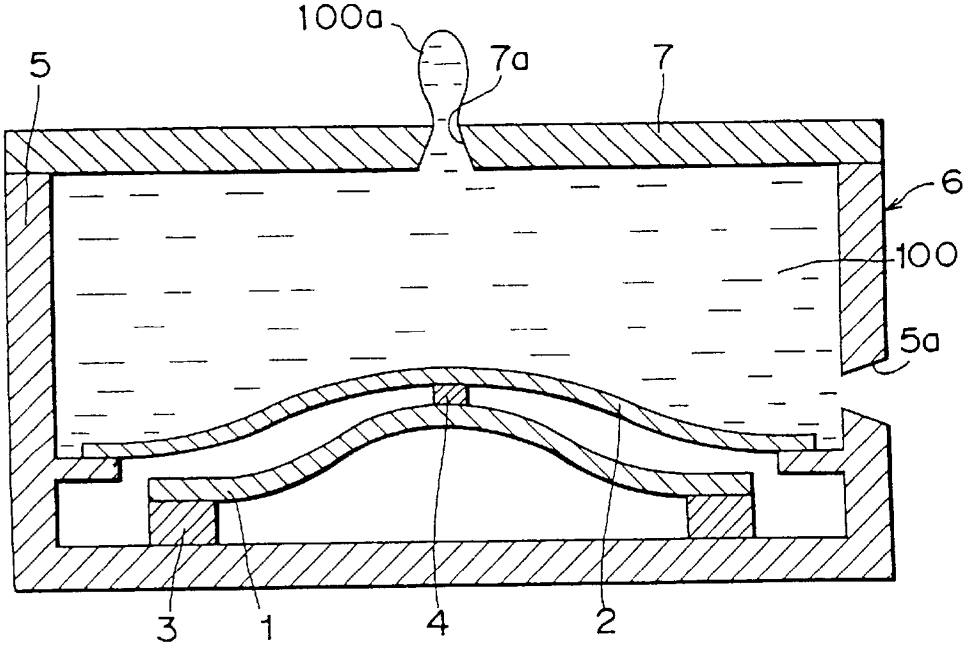

The ink jet head 10 having the above construction is driven as follows:

First, the ink 100 is filled into the ink chamber of the container 6 by injection through the ink supply opening 5*a*. Then, the switch 8 is turned on. When electric current has flowed through the buckling structure 1 from the power source 9 via the electrodes 1*a* and 1*b* positioned at both ends of the buckling structure 1, the buckling structure 1 is heated by resistance heating. Consequently, the buckling structure 1 is thermally expanded but not in the longitudinal direction, because both longitudinal ends thereof are fixed to the bottom surface of the casing 5 via the installing member 3. Therefore, a compression force is accumulated in the plane of the buckling structure 1 in the longitudinal direction. When the compression force exceeds a buckling load determined by the material of the buckling structure 1 and the dimension thereof, the buckling structure 1 is deformed vertically upward to a great extent, as shown in FIGS. 2A and 2B.

The force generated by the buckling deformation is applied to the center of the diaphragm 2 through the connection member 4. As a result, the diaphragm 2, both ends of which have been fixed to the inner horizontal wall of the casing 5 is also elastically deformed to a great extent, thus compressing the ink 100 stored in the ink chamber liquid-tightly partitioned from the lower space accommodating the buckling structure 1. As a result, the ink 100 is discharged to the outside as ink droplets 100*a* from the ink discharge opening 7*a* formed at the center of the nozzle plate 7.

Then, when the switch 8 is turned off to stop the supply of electric current, the buckling structure 1 is contracted due to cooling and thus, thermal stress is eliminated therefrom, with the result that the buckling structure 1 is returned to the original state shown in FIGS. 1A and 1B. In this manner, printing is carried out on a sheet of recording paper by the ink droplets 100*a* discharged to the outside by repeated ON and OFF of the switch 8.

Though the in-plane longitudinal displacement of the buckling structure 1 with fixed ends caused by the applied compression force exceeding the buckling load is small, there is produced a large perpendicular displacement in the buckling structure 1. Thus, it is possible to allow the buckling structure 1 to have a simple construction and a reduced size. Thus, a great discharge force can be obtained although the buckling structure 1 is small. Further, because the diaphragm 2 partitioning the ink chamber liquid-tightly is provided to cover the buckling structure 1, the ink 100 is prevented from being leaked into the lower space. In addition, the diaphragm 2 having a great area compresses the ink 100, thus providing a great discharge force.

In the embodiment, the ink jet head having one buckling structure accommodated in an ink chamber of the container and connected at one portion with the rectangular diaphragm by the connection member has been described, but the number of the buckling structures and that of the connection members and the configuration of the diaphragm are not limited to the number and the configuration of this embodiment but a desired number and configuration can be selected.

Figure 3:
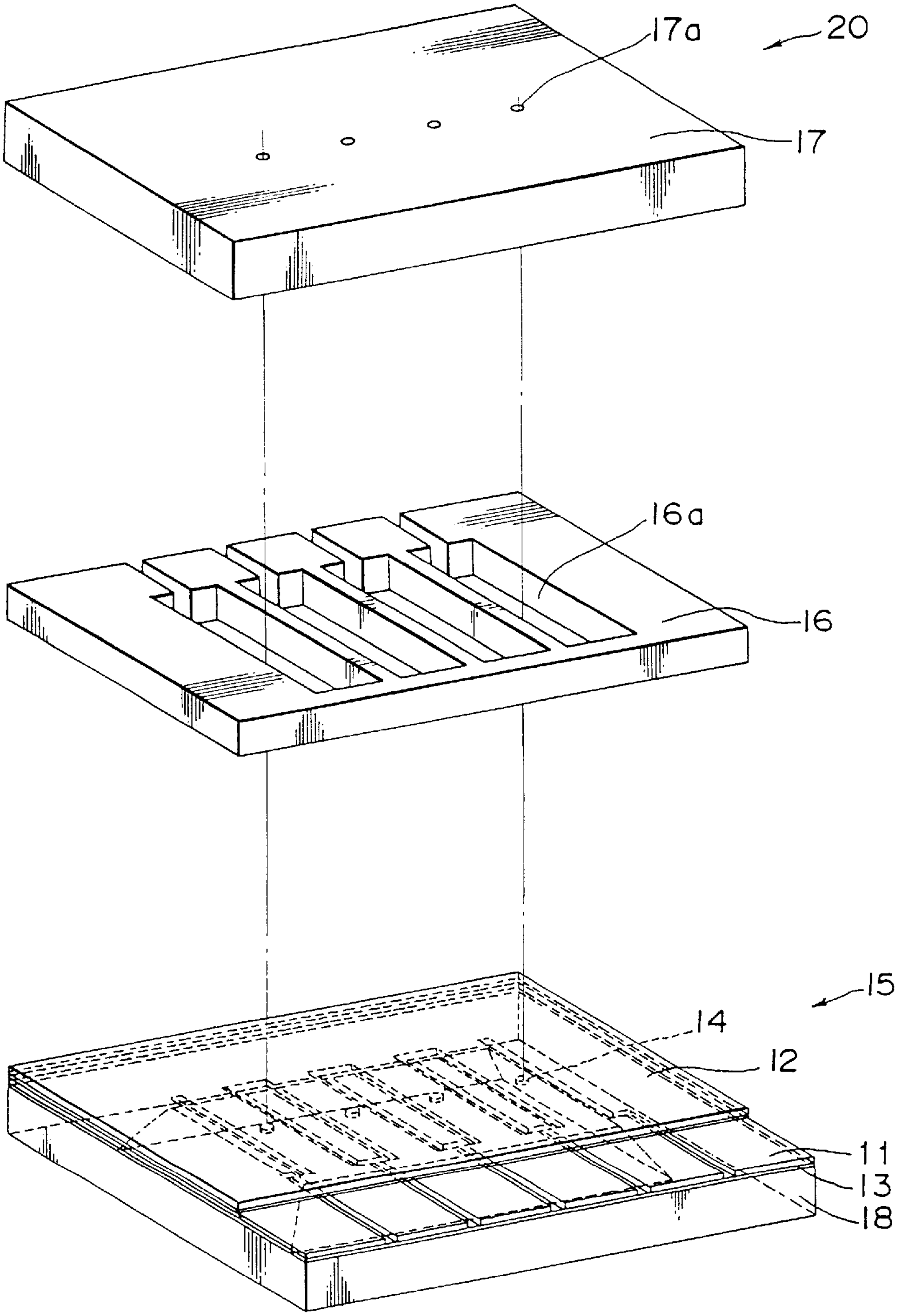
FIG. 3 is an exploded perspective view showing an embodiment of an ink jet head having a plurality of ink chambers.
Figure 4:
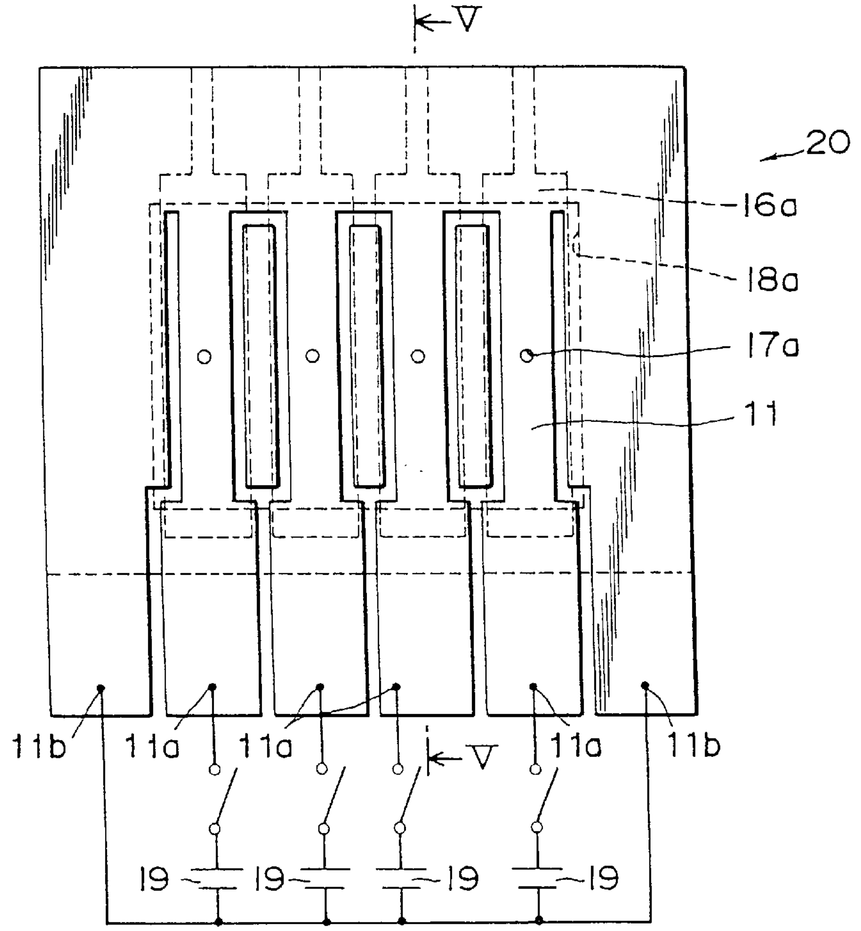
FIG. 4 is a plan view showing the embodiment of the ink jet head shown in FIG. 3.
Figure 5:
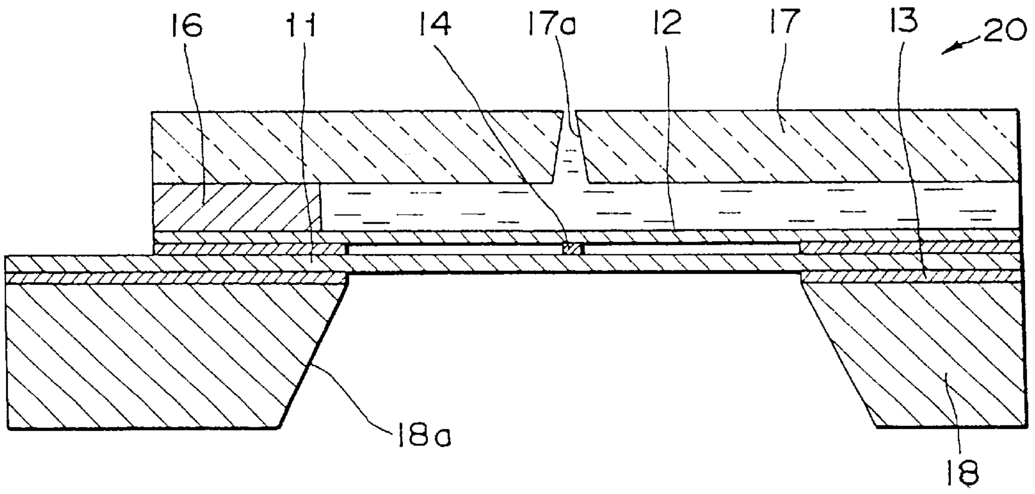
FIG. 5 is a view taken along a line V—V of FIG. 4.

FIGS. 3, 4, and 5 are an exploded perspective view, a plan view, and a sectional view (view along a line V—V of FIG. 4), respectively showing an embodiment of an ink jet head comprising a plurality of buckling structures, ink chambers and the like.

As shown in FIG. 3, an ink jet head 20 comprises a casing 15 to form a lower space of a container; a spacer 16 mounted on the upper surface of the casing 15 so as to form ink chambers; and a nozzle plate 17 to serve as a cover, having ink discharge openings, positioned on the top of the ink jet head 20.

As also shown in FIG. 5, the casing 15 comprises a substrate 18 having a tapered concave 18a corresponding to a common lower space and forming a principal portion of the casing 15. The casing 15 also includes four approximately rectangular buckling structures 11 arranged in parallel with each other, with both longitudinal ends thereof fixed to the upper surface of the substrate 18 via an installing member 131, and a one-piece common diaphragm 12, four sides of which are fixed to the upper surface of the buckling structure 11 via the installing member 13 and connected with the center portion of each buckling structure 11 via each connection member 14. In the plan view of FIG. 4, in order to clarify the buckling structure 11, the outline of the spacer 16 and that of the concave 18*a* of the substrate 18 are drawn by broken lines.

The substrate 18 is made of monocrystal silicon, the plane azimuth of which is 100. As shown in FIG. 4, the four buckling structures 11 mounted on the upper surface of the substrate 18 connect with each other at one longitudinal end and have a pair of common electrode strips branching off from both sides of the longitudinal end and extending in the longitudinal direction of the buckling structures 11. An operation electrode 11*a* positioned at the other end of each buckling structure 11 is connected with the positive terminal of each power source 19 via a switch while the other end of each buckling structure 11 is connected with the negative terminal of each power source 19 via common electrodes 11*b* and 11*b* of the common electrode strip. In this manner, electric current is supplied to each buckling structure.

As shown in FIG. 3, the spacer 16 is made of, for example, a stainless steel plate having a thickness of 10–50 $\mu$m and there are formed on the spacer 16 four ink chambers and four openings 16*a* constituting an ink supply opening by punching or the like, in correspondence to the buckling structures 11. The nozzle plate 17 is made of, for example, a glass plate having a thickness of 0.2 mm, and has four conic ink discharge openings 17*a* tapered toward the outside by etching it with hydrofluoric acid or the like. The nozzle plate 17 is bonded to the casing 15 via the spacer 16 with adhesive agent or the like.

Figure 6A:
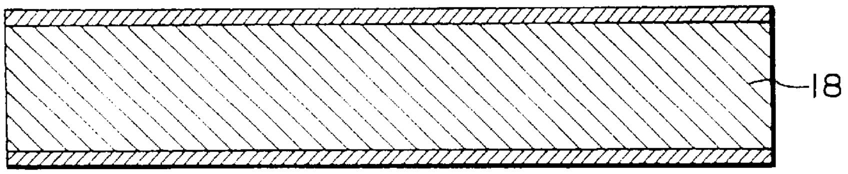
FIGS. 6A through 6E are sectional views showing a procedure for manufacturing a casing of the embodiment shown in FIG. 3.

The casing 15 is produced by a procedure shown in FIGS. 6A through 6E and FIGS. 7F through 7J. Initially, as shown in FIG. 6A, the substrate 18 made of monocrystal silicon, the plane azimuth of which is (100) is prepared. A silicon oxide ($SiO_2$) layer (hereinafter abbreviated as PSG (phosphosilicate glass)) having a thickness of 2 $\mu$m containing 6–8% of phosphorous (P) is formed on the upper and lower surfaces of the substrate 18 by pressure reduction CVD method.

Figure 6B:
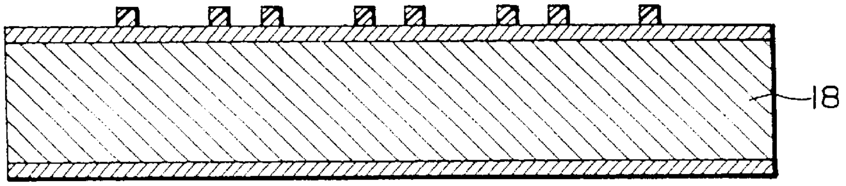
Figure 6C:
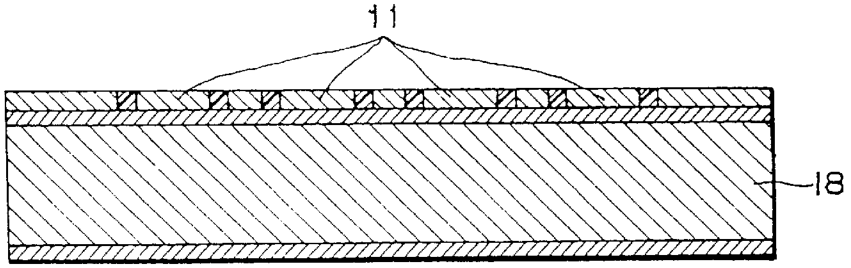

Then, as shown in FIG. 6B, resist having a thickness of 6 $\mu$m is formed and patterned on the upper surface of the substrate 18. Then, as shown in FIG. 6C, for example by electrolytic plating, a nickel (Ni) layer having a thickness of 6 $\mu$m is formed on the portion, of the upper surface of the substrate 18, on which the resist has not been patterned. The buckling structure 11 comprising the nickel layer is formed by the above process.

Figure 6D:
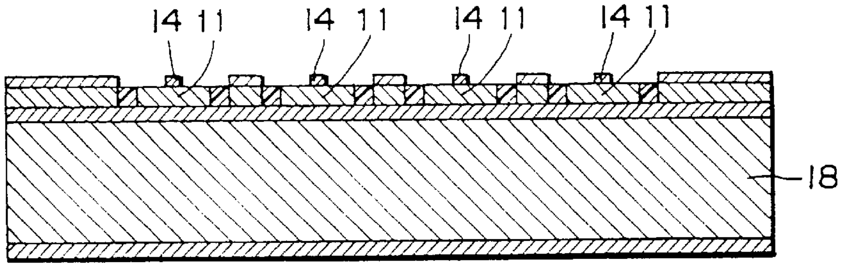
Figure 6E:
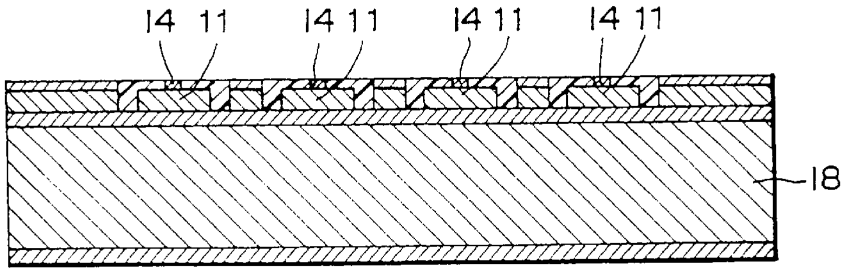
Figure 7F:
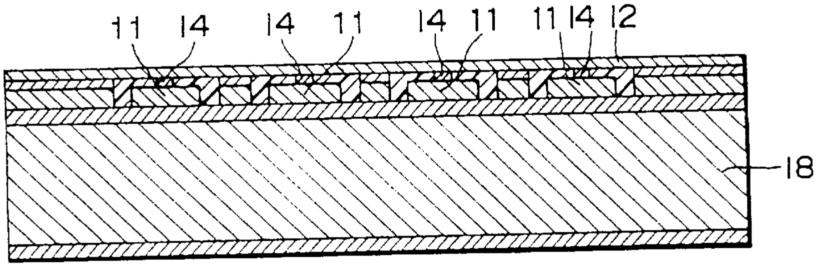
FIGS. 7F through 7J are sectional views showing a procedure for manufacturing the casing of the embodiment shown in FIG. 3.

Then, as shown in FIG. 6D, a PSG layer having, for example, a thickness of 2 $\mu$m is formed and patterned on the center portion of the buckling structure 11 to form the connection member 14 made of the PSG layer. Then, as shown in FIG. 6E, resist is applied to the portion, of the upper surface of the buckling structure 11, on which the PSG layer has not been patterned, in such a manner that upper surface of the resist is flush with that of the connection member 14. Then, as shown in FIG. 7F, a nickel (Ni) layer having a thickness of 3 $\mu$m is formed on the upper surface of the connection member 14 and that of the resist by electrolytic plating or the like. In this manner, the diaphragm 12 made of the nickel layer is formed.

Figure 7G:
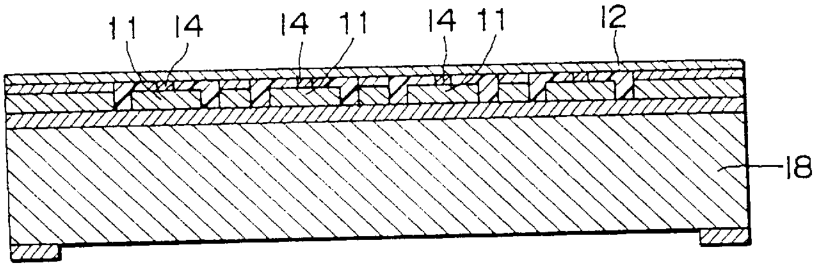
Figure 7H:
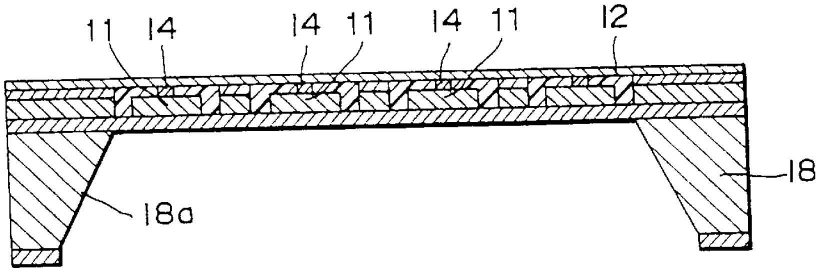
Figure 7I:
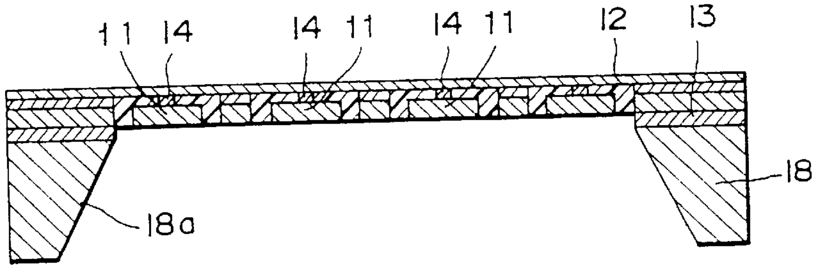
Figure 7J:
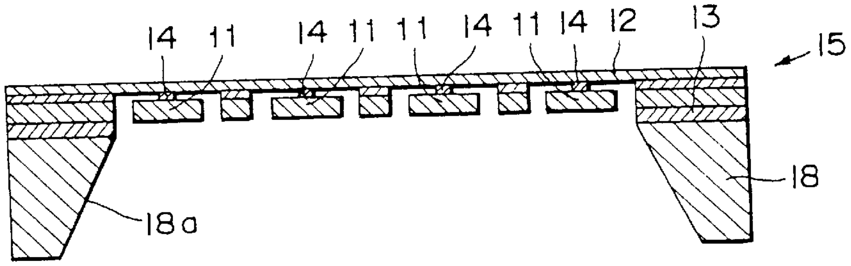

Then, the lower surface of the substrate 18 is treated. As shown in FIG. 7G, the PSG layer formed on the lower surface of the substrate 18 is patterned, and then, the substrate 18 is etched with potassium hydroxide (KOH) which is an anisotropic etching solution, with the patterned PSG layer serving as a mask to form the tapered concave 18*a* penetrating through the substrate 18, as shown in FIG. 7H. Then, as shown in FIG. 7I, the PSG layer is etched, with the tapered concave 18*a* of the etched substrate 18 serving as a mask, to form the installing member 13. Finally, the resist is removed to complete the formation of the casing 15 having a desired construction as shown in FIG. 7J.

The ink jet head 20 according the embodiment described with reference to FIG. 3 and the following Figs. comprises four ink discharge portions arranged in parallel with each other, each of which comprises buckling structure 11, ink chambers and so on. Each ink discharge portion is turned on and off by each switch and operated similarly to that of the embodiment described with reference to FIGS. 1A and 1B, thus independently discharging ink from each ink discharge opening 17*a* so as to perform printing.

In this embodiment, because the substrate 18, the diaphragm 12, the spacer 16, and the nozzle plate 17 are assembled as a unit, and the four ink discharge portions are made simultaneously in the above-described manufacturing process, a plurality of ink discharge portions controllable independently can be manufactured compactly and at low costs, and hence, the ink jet head has an improved function.

In this embodiment, the multi-nozzle head having the four ink discharge portions has been described, but the number of the buckling structures is not limited to four, but a desired number thereof can be selected.

Figure 8A:
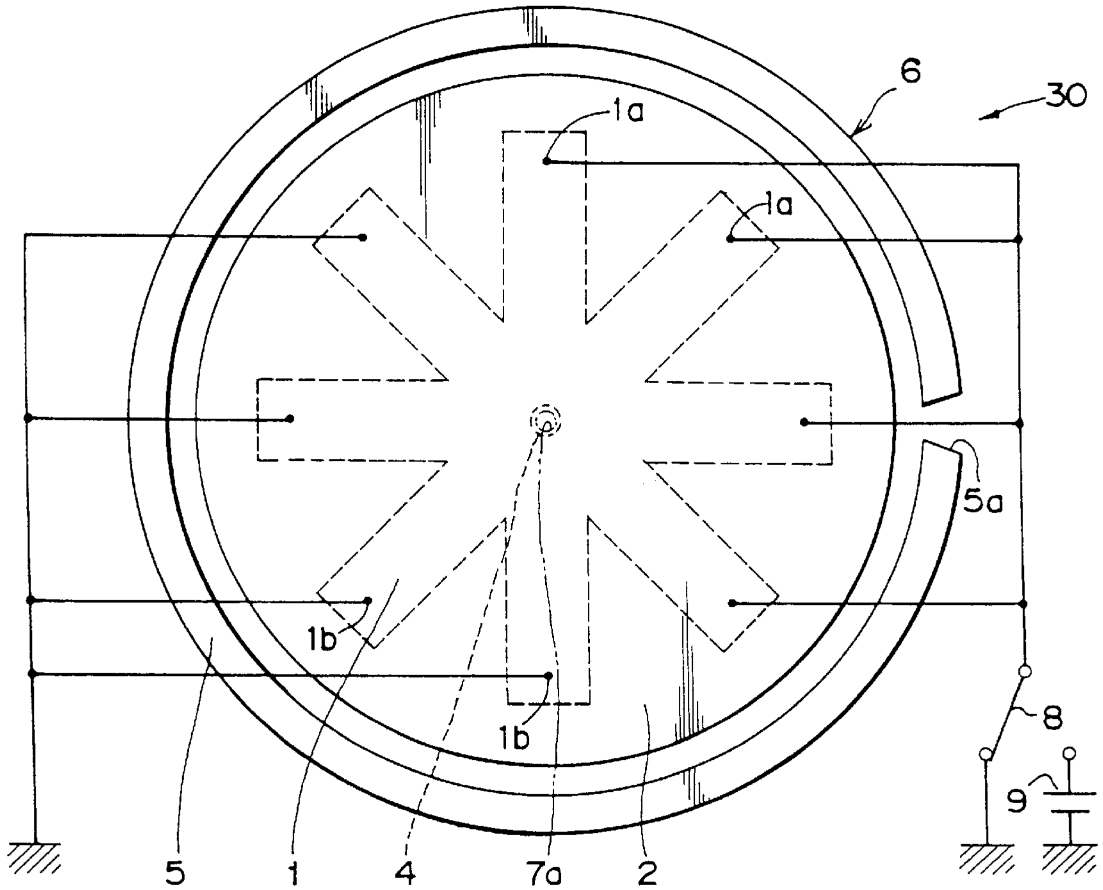
FIGS. 8A and 8B are a plan view and a sectional view, respectively showing an embodiment of an ink jet head, described in claim 6, having a radial buckling structure.
Figure 8B:
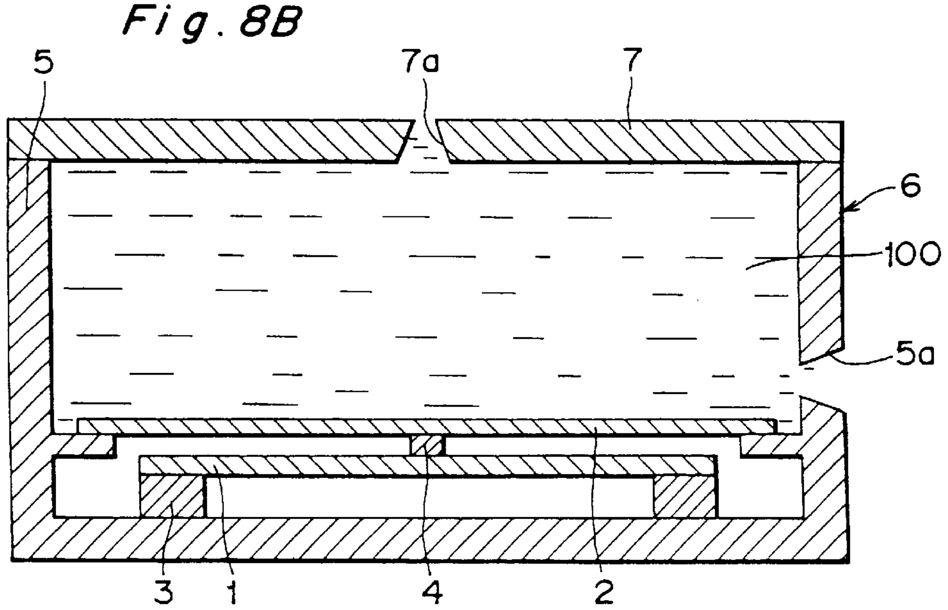

FIGS. 8A and 8B are a plan view and a sectional view, respectively showing an embodiment of an ink jet head having a radial buckling structure.

An ink jet head 30 according to this embodiment is different from the embodiment described with reference to FIGS. 1A and 1B in that the ink jet head 30 has a container 6 comprising a cylindrical casing 5 and a disk-shaped nozzle plate 7, a buckling structure 1 is radial, and a diaphragm 2 is disk-shaped.

The buckling structure 1 comprises eight rectangular strips radially projected in the same plane from the center of the buckling structure 1 to make four sets of straight diametrical strip. The leading end of each rectangular strip is fixed to the bottom surface of the casing 5 via the installing member 3, and the upper surface of the center portion of the buckling structure 1 is connected to the diaphragm 2 by means of the connection member 4. One end of each set of straight diametrical strips constituting the buckling structure 1 is connected with the power source 9 via each electrode la and the common switch 8, while the other end of each set of straight diametrical strips is grounded via each electrode 1*b*. When the switch 8 is turned on, electric current flows through the respective set of straight diametrical strip simultaneously.

In the ink jet head 30, when the switch 8 is turned on, the four sets of straight diametrical strips, both ends of which have been fixed to the bottom surface of the casing 5 are prevented from being expanded in the longitudinal direction and are simultaneously deformed upward largely owing to heating caused by the supply of electric current. The force generated by the buckling deformation is applied to the center of the diaphragm 2 through the connection member 4. As a result, the diaphragm 2, only opposed peripheral portions in one diametrical direction of which are fixed to an annular inner horizontal wall of the container 6 and which keeps the ink chamber liquid-tight is also elastically deformed to a great extent. The peripheries of the diaphragm 2 other than the above portions are not fixed but only placed on the inner horizontal wall, and the center of the diaphragm

2 is connected with the buckling structure 1 by the connection member 4. Therefore, the diaphragm 2 follows the movement of the buckling structure 1. However, the buckling deformation amount of the diaphragm 2 is approximately 10 μm at most at the center thereof, and the diaphragm 2 is subjected to a reaction force from the ink accommodated in the ink chamber when the ink is discharged to the outside. Consequently, the ink chamber is liquid-tightly maintained and hence, the ink is prevented from leaking into the lower space. The ink 100 stored in the ink chamber is compressed and discharged from the ink discharge opening 7*a* formed at the center of the nozzle plate 7 so as to carry out printing.

In this embodiment, since the buckling structure 1 comprises the four sets of straight diametrical strips, the energy stored per unit buckling deformation becomes larger compared with a buckling structure with one set of strips. Also, since the diaphragm 2 is fixed at only opposed peripheral portions in one diametrical direction thereof, the diaphragm 2 can be deformed greatly and provides a great discharge force.

Figure 9A:
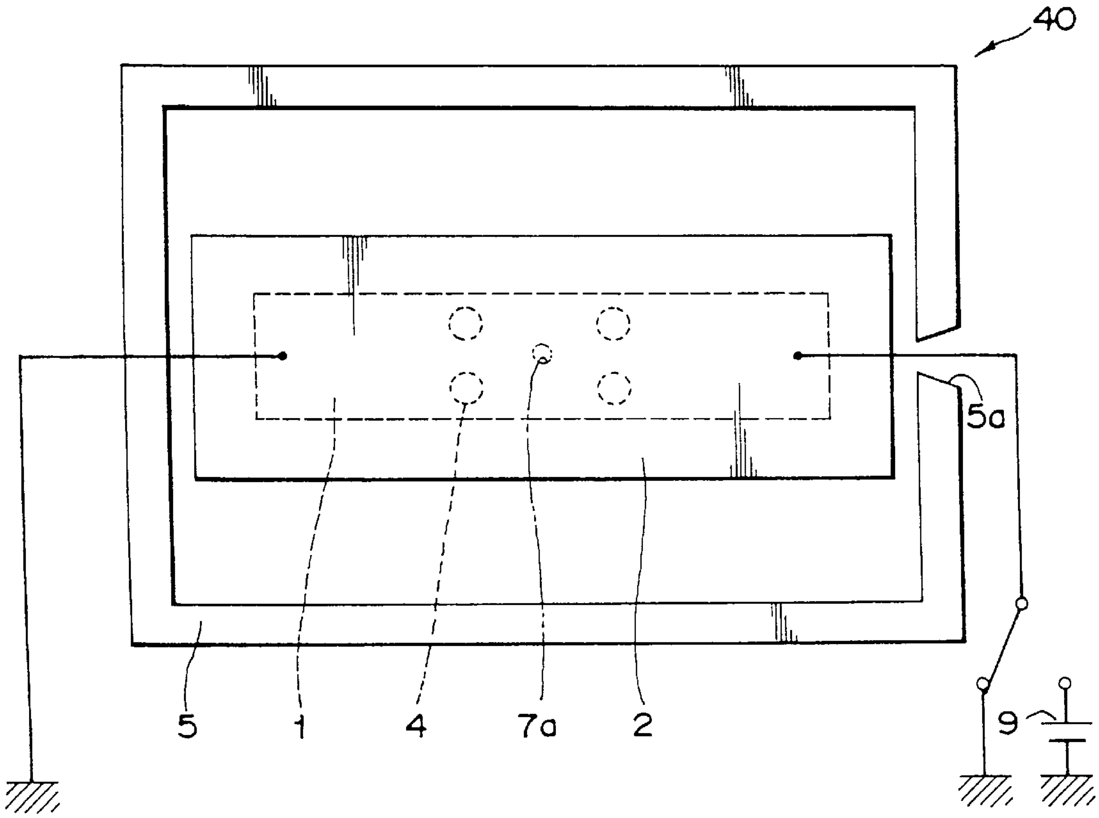
FIGS. 9A and 9B are a plan view and a sectional view, respectively showing an embodiment of an ink jet head, described in claim 2, comprising a plurality of connection members.
Figure 9B:
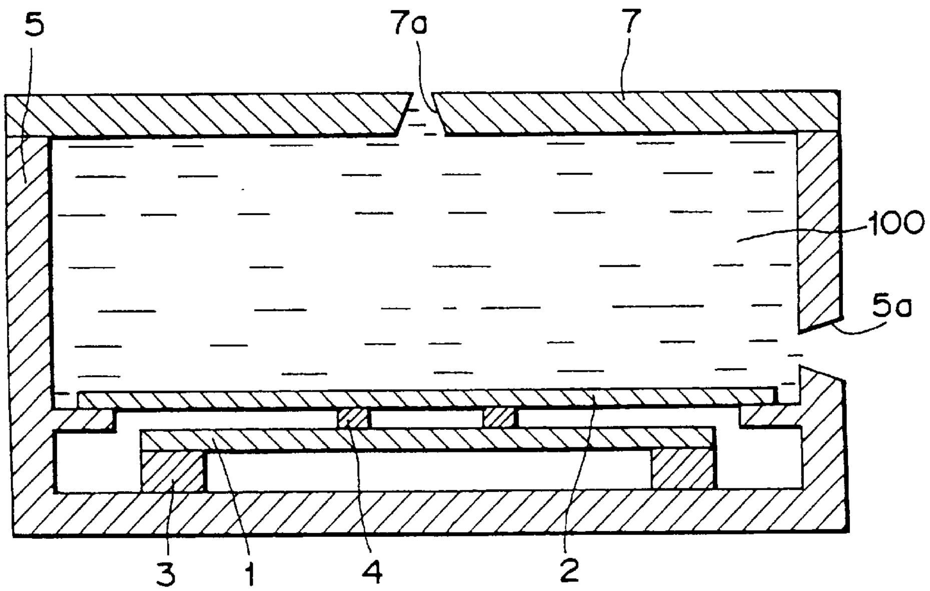

FIGS. 9A and 9B are a plan view and a sectional view, respectively showing-an embodiment of the ink jet head having a plurality of connection members.

An ink jet head 40 according to this embodiment is different from the embodiment described with reference to FIGS. 1A and 1B in that the plate-shaped rectangular buckling structure 1 is connected with the similar diaphragm 2 by means of four connection members 4 in the vicinity of the center thereof. Thus, the operation of discharging ink via the diaphragm 2 owing to the buckling deformation of the buckling structure 1 caused by the supply of electric current is essentially the same with the action described with reference to FIGS. 1A and 1B. Thus, the description of the action in this embodiment is omitted herein.

In this embodiment, since four connection members 4 are provided, a load is dispersedly applied to the diaphragm 2 and hence, stress is decreasingly generated therein. Thus, the longevity of the diaphragm 2 can be prolonged.

Figure 10A:
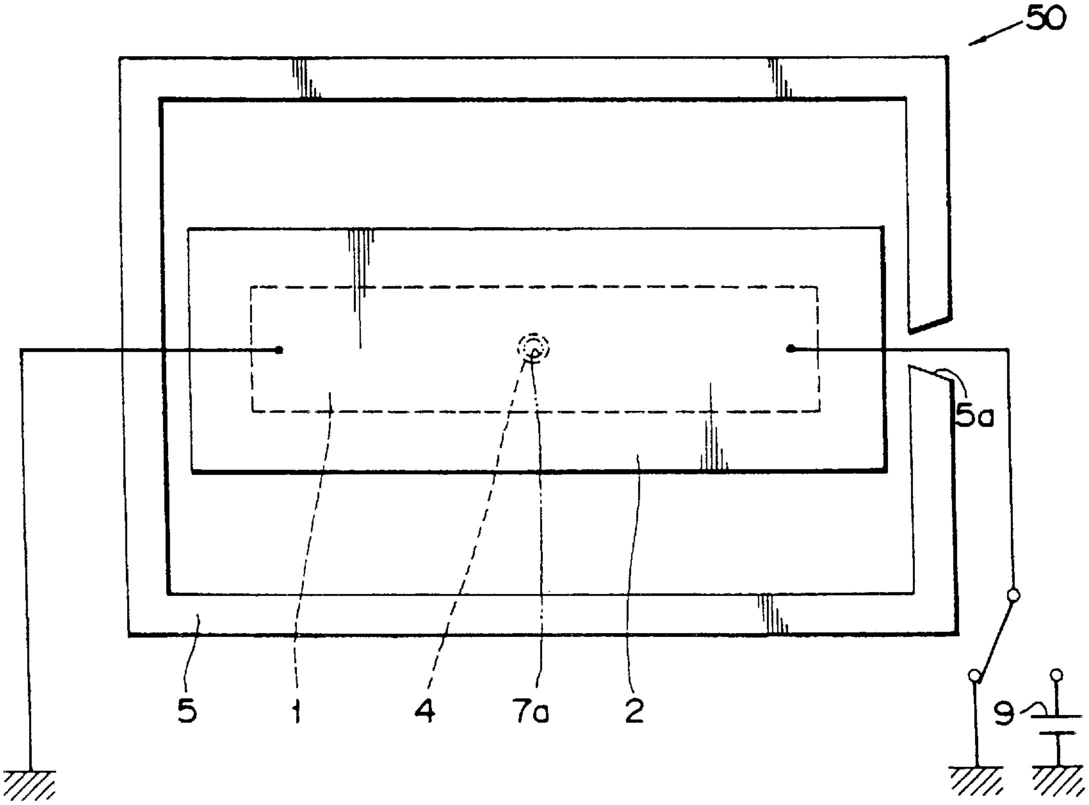
FIGS. 10A and 10B are a plan view and a sectional view, respectively showing an embodiment of an ink jet head, described in claim 4, in which a diaphragm is connected only via a connection member.
Figure 10B:
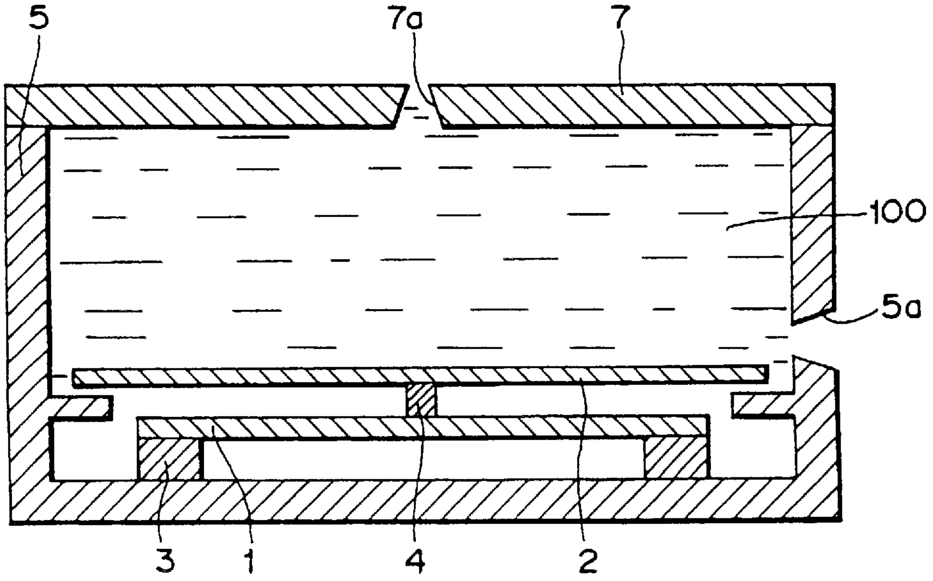

FIGS. 10A and 10B are a plan view and a sectional view, respectively showing an embodiment of the ink jet head in which a diaphragm is connected with other members via only a connection member.

An ink jet head 50 according to this embodiment is different from the embodiment described with reference to FIGS. 1A and 1B in that the plate-shaped rectangular diaphragm 2 is connected with only the buckling structure 1 via the connection member 4 positioned in the center thereof, and each end of the diaphragm 2 is not fixed to the inner horizontal wall of the casing 5. In the sectional view of FIG. 10B, it seems that a gap is provided between both ends of the diaphragm 2 and the inner horizontal wall in order to emphasize the difference between the construction of the ink jet head 50 and those of other embodiments. Actually, the gap is not provided between both ends of the diaphragm 2 and the inner horizontal wall, but they are in contact with each other. The amount of the displacement of the diaphragm 2 resulting from the buckling deformation of the buckling structure 1 is as small as 10 μm in the center thereof, and the diaphragm 2 is pressed against the inner horizontal wall by a liquid pressure when the ink is discharged. Therefore, the liquid pressure in the ink chamber is maintained and hence the leakage of the ink into the lower space does not occur.

Thus, the operation of discharging the ink by means of the buckling structure 1 according to this embodiment is not different from the operation described with reference to FIGS. 1A and 1B. Therefore, the description of the operation of discharging the ink according to this embodiment is omitted herein. In this embodiment, since the diaphragm 2 is not connected with any members other than the buckling structure 1 via the connection member 4, stress is decreasingly generated in the diaphragm 2, with the ink chamber being maintained liquid-tight. Thus, the longevity of the diaphragm 2 can be prolonged.

Figure 11A:
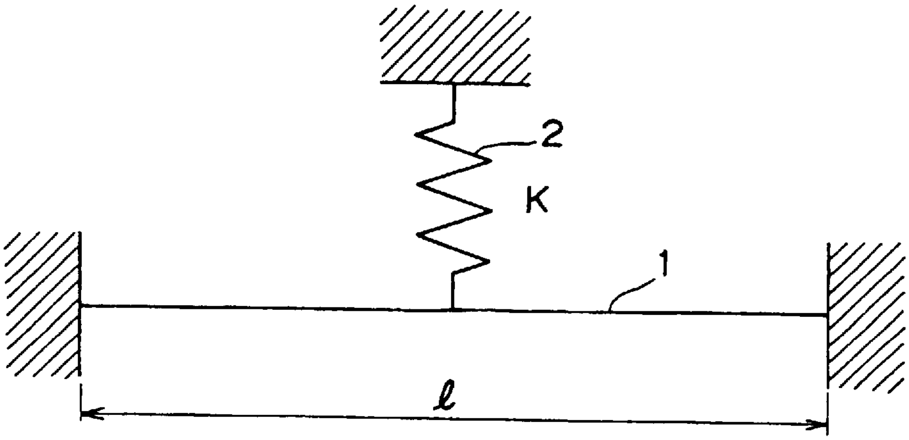
FIGS. 11A and 11B are model views showing a mechanical system for finding the configuration and size of the buckling structure described in claims 6 through 12.
Figure 11B:
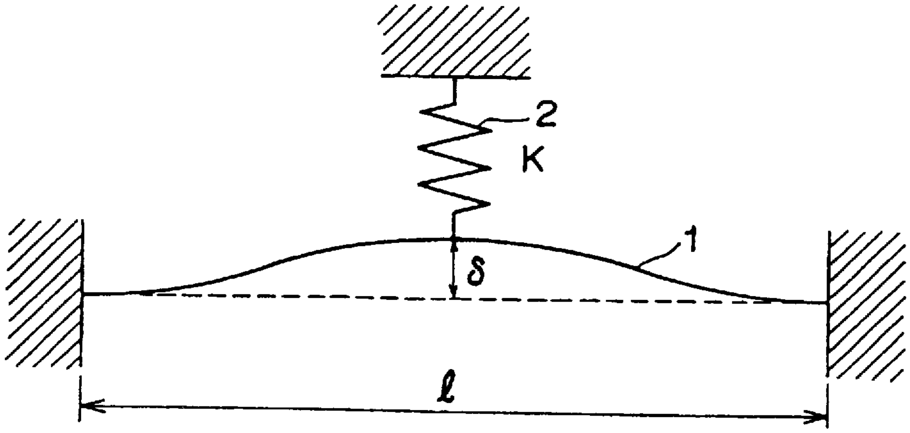

FIGS. 11A and 11B are model views showing the diaphragm-provided mechanical system for finding the configuration and dimension of the buckling structures, suitable for the discharge of ink.

The buckling structure 1, both ends of which have been fixed to the inner horizontal wall of the casing 5 and the diaphragm 2 being the upper end thereof are connected with each other at only the center of the buckling structure 1, and the deformation amount of the diaphragm 2 and a load are in a linear relationship. Supposing that the temperature of the buckling structure 1 shown in FIG. 11A has been changed by (t) and as a result, the buckling structure 1 has been deformed as shown in FIG. 11B, energy (U) of the entire mechanical system is expressed by an equation shown below:

$$U=\{3A\pi^4\delta^4+(2Ah^2\pi^4-6Al^2\alpha t\pi^2+12l^3k)\delta^2+12Al^4\alpha^2t^2\}/24l^3 \quad (1)$$

where

Figure 12:
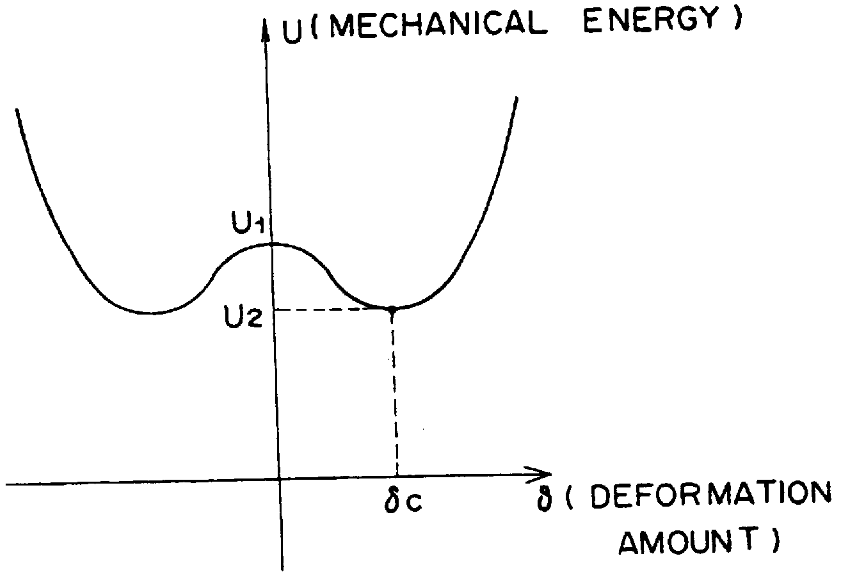
FIGS. 12 is a graph showing the change in the buckling energy of the mechanical system with respect to the change in the amount of a deformation which occurs at the center of the model shown in FIGS. 11A and 11B.

E: Young's modulus of buckling structure, b: width of buckling structure, h: thickness of buckling structure, n: number of sets of straight diametrical strip constituting buckling structure;

α: coefficient of linear expansion of buckling structure, l: length of buckling structure, k: spring constant of diaphragm, δ: deformation amount of buckling structure at its center, t: temperature change in buckling structure, and A=nEbh The change in the energy (U) of the entire mechanical system with respect to the change in the deformation amount δ of the buckling structure 1 at its center is as shown in FIG. 12. As shown in FIG. 12, when the deformation amount δ of the buckling structure 1 at its center is a value δc, the energy (U) of the dynamic system takes a minimum value $U_2$ at which the dynamic system has a stable state.

Substitution of δ=0 and δ=δc into equation (1) gives energies $U_1$ and $U_2$ as follows when the deformation amount δ is 0 and δc:

$$U_1=Al^4\alpha^2t^2/2l^3 \quad (2)$$

$$U_2=\{3A\pi^4\delta c^4+(2Ah^2\pi^4-6Al^2\alpha t\pi^2+12l^3k)\delta c^2+12Al^4\alpha^2t^2\}/24l^3 \quad (3)$$

The deformation amount δc which gives the minimum energy $U_2$ is expressed by an equation shown below, because $$dU_2/d\delta c=0\{6A\pi^4\delta c^3+(2Ah^2\pi^4-6Al^2\alpha t\pi^2+12l^3k)\delta c/12l^3=0$$

The deformation amount δc which satisfies this equation is as follows:

$$\delta c=0\pm\{(3Al^2\alpha t\pi^2-Ah^2\pi^4-6l^3k)/3A\pi^4\}^{1/2} \quad (4)$$

Since the former is unsuitable as the solution, the latter is the solution, and the value within the radical sign of the solution should be positive. Thus, the following equation is established in consideration of A=nEbh:

$$(3nEbhl^2\alpha t\pi^2-nEbh^3\pi^4-6l^3k)/3nEbh\pi^4>0 \tag{5}$$

Solving equation (5) for (h), the range of the thickness of the buckling structure, which enables a minimum energy $U_2$ and therefore buckling energy $(U_1-U_2)$ being the prerequisite for applying pressure to ink to exist, is found by the following equation:

$$2l(-p)\cos(u/3+4\pi/3)<h<2l(-p)\cos(u/3) \tag{6}$$

where $$p=-\alpha t/\pi^2,\ q=3\ k/nEb\pi^4,\ u=\cos^{-1}\{q/p(-p)^{1/2}\},\ 0\leq u\leq\pi$$

The buckling energy $(U_1-U_2)$ is found as follows from equations (2), (3), and (4):

$$U_1-U_2=(3nEbhl^2\alpha t\pi^2-nEbh^3\pi^4-6\ l^3k)^2/18nEbhl^3\pi^4 \tag{7}$$

Figure 13:
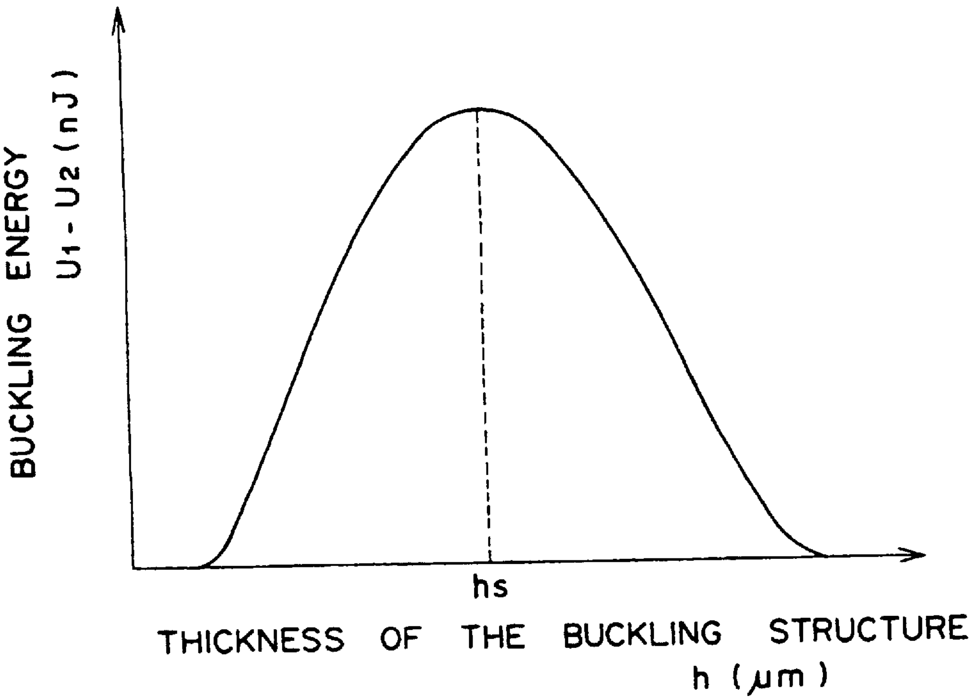
FIG. 13 is a graph showing the change in the buckling energy with respect to the change in the thickness of the buckling structure.

The change in the buckling energy $(U_1-U_2)$, given by equation (7), with respect to the change of the thickness (h) of the buckling structure is as shown in FIG. 13. In this drawing, the range of the thickness (h) of the abscissa to make the buckling energy $(U_1-U_2)$ of the ordinate positive is the range shown by equation (6).

As shown in FIG. 13, an optimum value hs which makes the buckling energy maximum in the range of the thickness (h) is present. The value hs is obtained as follows by setting the differential coefficient regarding (h) of equation (7) to 0:

$$hs=l\{-s+(s^2+r^3)^{1/2}\}^{1/3}+l\ \{-s-(s^2+r^3)^{1/2}\}^{1/3};\ \text{when } s^2+r^3>0,$$
$$hs=2l(-r)\cos(w/3);\ \text{when } s^2+r^3<0 \tag{8}$$

where $$r=-\alpha t/5\pi^2,\ s=-3k/5nEb\pi^4,\ w=\cos^{-1}\{s/r(-r)^{1/2}\},\ 0\leq w\leq\pi$$

An energy Ut necessary to discharge an ink droplet is found by the following equation as the addition of the kinetic energy of the ink droplet, a surface energy thereof, and a friction loss energy at the time of the passage of the ink through the ink discharge opening:

$$Ut=mv^2/2+\sigma S+8\pi\mu L^2v \tag{9}$$

where m: mass of ink droplet, v: discharge speed of ink droplet, π: surface tension of ink, S: surface area of ink droplet, μ: viscosity coefficient of ink, and L: length of ink discharge opening.

Accordingly, in order for the buckling structure to discharge ink droplets, it is necessary for the thickness (h) of the buckling structure to be in the range which satisfies the following equation:

$$U_1-U_2=(3nEbhl^2\alpha t\pi^2-nEbh^3\pi^4-6l^3k)^2/18nEbhl^3\pi^4>Ut=mv^2/2+\sigma S+8\pi\mu L^2v \tag{10}$$

Figure 14:
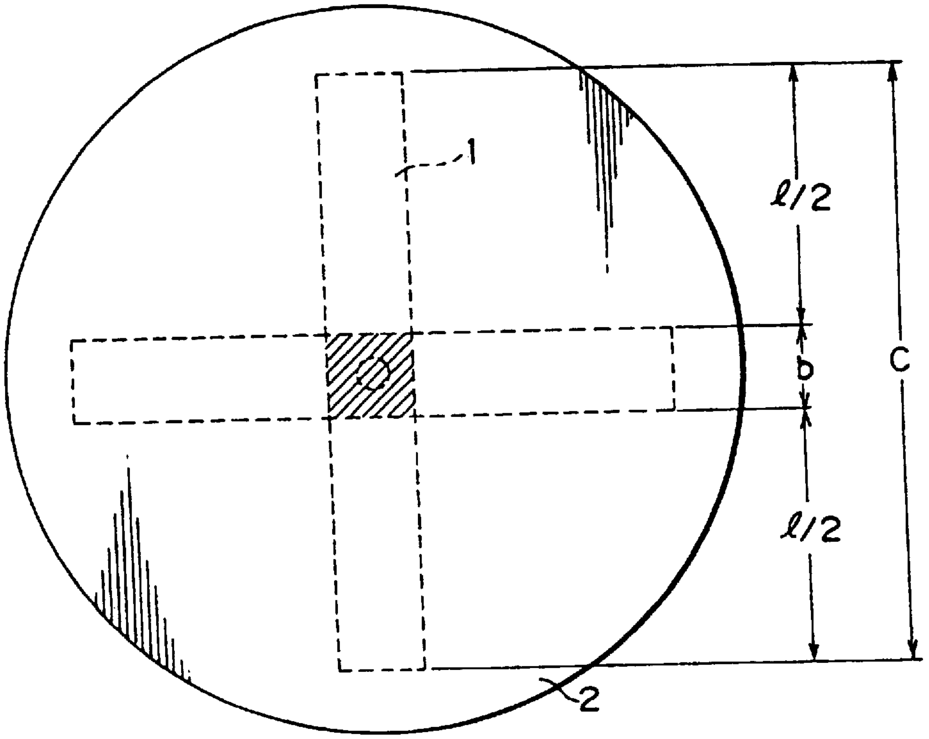
FIG. 14 is a plan view showing a buckling structure for finding the dimension described in claims 10 through 12.

FIG. 14 is a plan view showing a buckling structure to be used to find a through 13. The buckling structure 1 comprises four rectangular strips projecting radially in the same plane from the center thereof at circumferential intervals of 90°. Thus, the number of sets of straight strip extending diametrically is two. The center portion (hatched in FIG. 14) is the incorporated portion of the two rectangular strips and is hardly buckled. Thus, the length of the center portion is excluded from the length of the buckling structure. Supposing that the entire length of the buckling structure (straight diametrical strip) from one end thereof to the other thereof is C, the width (b) of the rectangular strip equal to the dimension of a side of the center portion is: b=C−l (l is effective length of buckling structure of FIG. 14). Assuming that the number of sets of straight diametrical strips is n, an equation regarding the width (b) of the rectangular strip is expressed as follows:

$$b=(C-l)/\tan\{(n-1)\pi/2n\} \tag{11}$$

Figure 15:
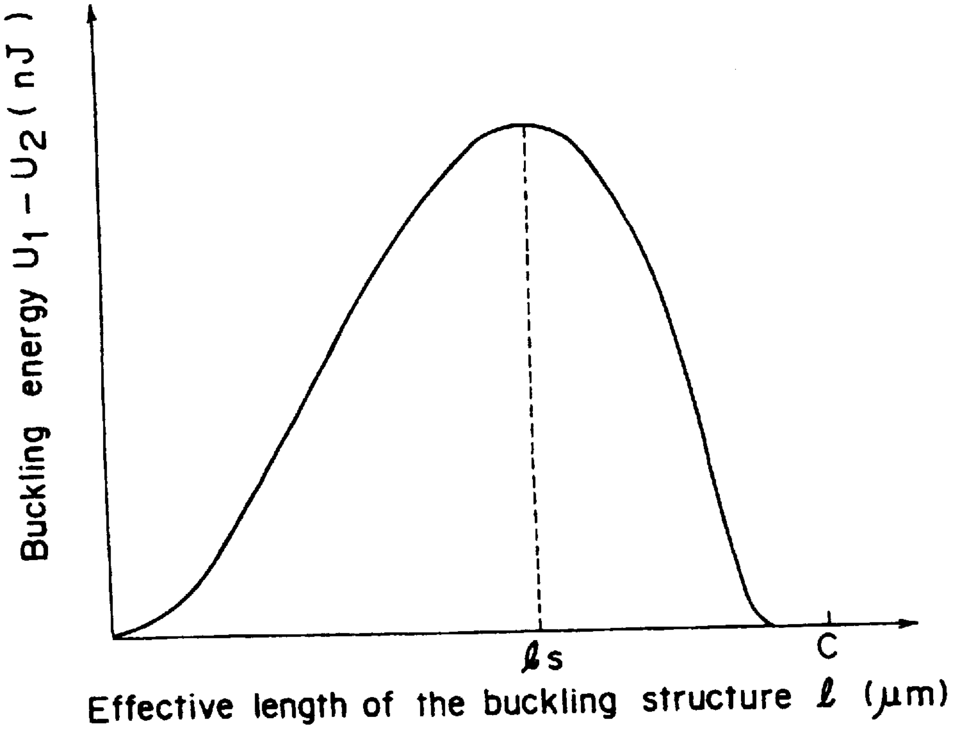
FIG. 15 is a graph showing the change in the buckling energy with respect to the change in the effective length of the buckling structure having an optimum thickness.

The change in the buckling energy $(U_1-U_2)$ with respect to the change in the effective length (l) of the buckling structure is as shown in FIG. 15. An optimum value ls is present in the range in which the buckling energy is obtained. That is, in order to obtain the buckling energy, the effective length (l) is required to be in the range which satisfies an equation shown below:

$$(3nEbhl^2\alpha t\pi^2-nEbh^3\pi^4-6\ l^3k)^2/18nEbhl^3\pi^4>0 \tag{12}$$

The optimum value ls of the effective length (l) to give a maximum buckling energy is given by the following equation, supposing that a differential coefficient regarding (l) of the left side of equation (12) is zero.

$$d\{(3nEbhl^2\alpha t\pi^2-nEbh^3\pi^4-6\ l^3k)^2/18nEbhl^3\pi^4\}/dl=0 \tag{13}$$

In order for the buckling structure to discharge ink droplets, the effective length (l) must be in the range which satisfies the following equation, because $(U_1-U_2)>Ut$:

$$(3nEbhl^2\alpha t\pi^2-nEbh^3\pi^4-6l^3k)^2/18nEbhl^3\pi^4\}/mv^2/2+\sigma S+8\pi\mu L^2v \tag{14}$$

Description is made below on examples of the thickness (h) and length (l) of the buckling structure suitable for the discharge of ink obtained by analysis, based on the mechanical model shown in FIGS. 11A and 11B.

Energy required to discharge an ink droplet having a diameter of 50 μm at a speed of 10 m/s is approximately 10 nJ from equation (9), supposing that the characteristics of the ink are as follows. The buckling structure and the diaphragm are made of nickel and constants of materials used are as follows. Temperature change (t) is 100° C.

$\sigma=60\times10^{-1}$N/m, $\mu$=2cP, L=35 μm

Density (m) of ink=1000 kg/$m^3$

E=$E_d$ (Young's modulus of diaphragm)=210 GPa $\nu_d$=(Poisson's ratio of diaphragm)=0.3, $\alpha=13.4\times10^{-6}$/°C.

Figure 16A:
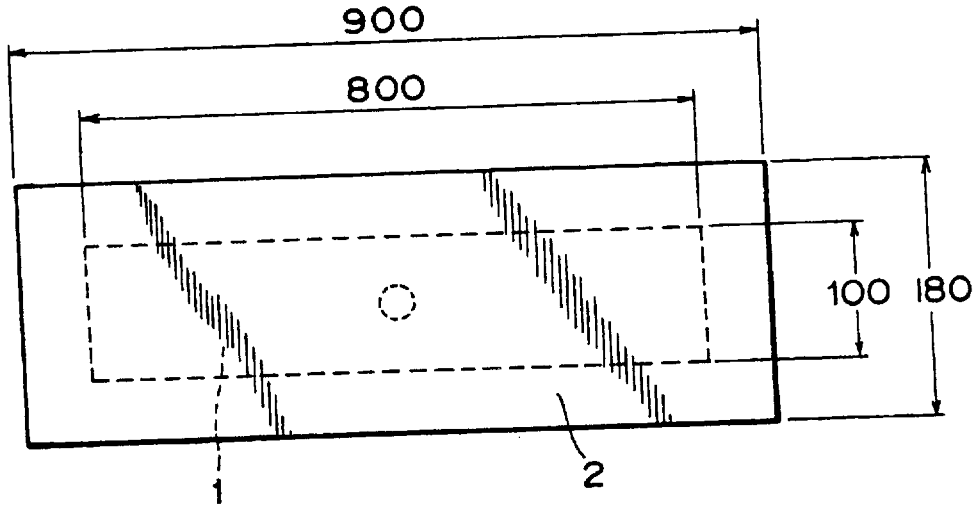
FIG. 16A and 16B are a plan view and a sectional view, respectively showing a first design example of an ink jet head based on the analysis of the model.
Figure 16B:
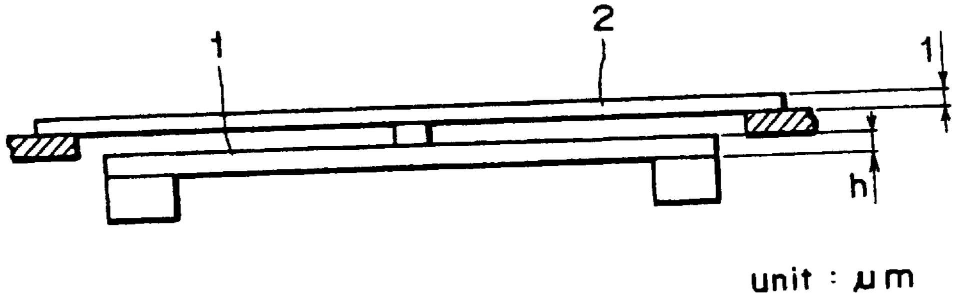
Figure 17:
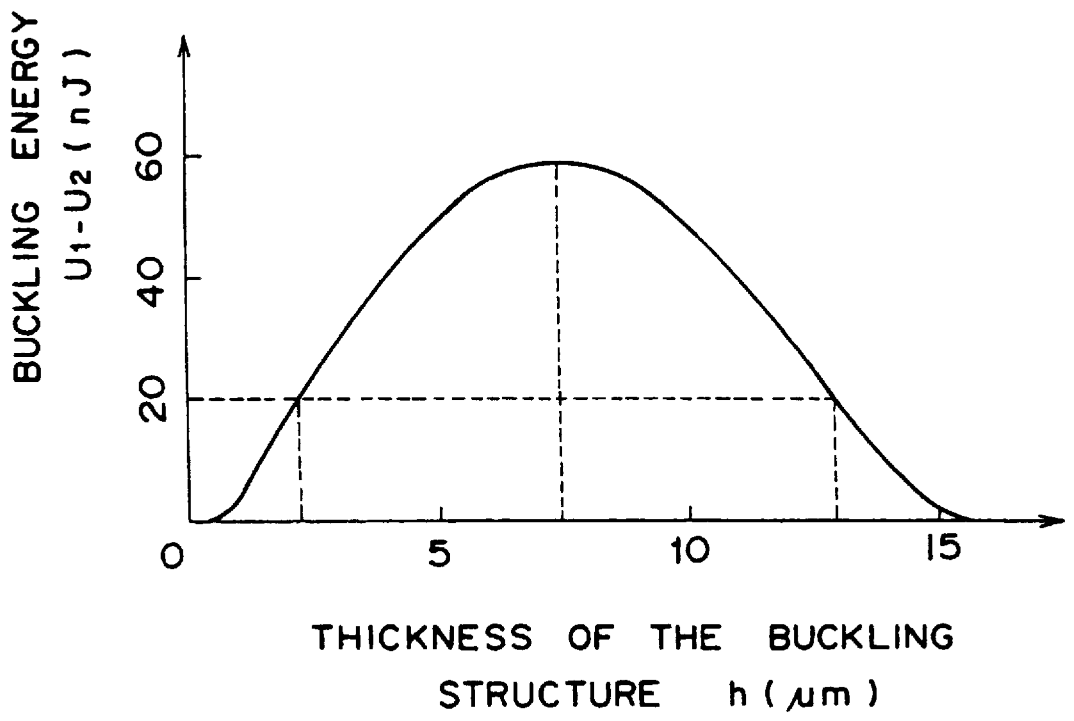
FIG. 17 is a graph showing the change in the buckling energy with respect to the change in the thickness of a buckling structure of the first design example shown in FIG. 16A and 16B.

FIGS. 16A and 16B show dimensions of respective portions of an ink jet head according to a first design example. The spring constant (k) of the rectangular diaphragm 2 is expressed by the following equation, based on theory, in strength of materials, regarding deflection of plates:

$$k=E_dh_d^3/Ab_d^2=81.8\text{N/m}$$

where $b_d$: shorter side of diaphragm, $h_d$: thickness of diaphragm, A: constant to be determined by the ratio between longer side of the diaphragm and shorter side thereof The change in the buckling energy $(U_1-U_2)$ with respect to the change in the thickness (h) of the buckling structure 1 of the first design example is shown in FIG. 17. The range of the thickness (h) of the buckling structure 1 to obtain the buckling energy is as follows, based on equation (6):

$$0.38\ \mu m<h<15.8\ \mu m.$$

In order to allow the buckling energy to be twice, namely, 2 OnJ as large as the energy required to discharge ink droplets, the range of the thickness (h) of the buckling structure 1 is required to fall in the following range, based on equation (10)

$$2.3\ \mu m < h < 13.0\ \mu m$$

Further, the optimum value hs of the thickness of the buckling structure 1 is: hs=7.4 $\mu$m, based on equation (8). Thus, it is preferable to design the thickness of the buckling structure 1 in the vicinity of the optimum value hs.

Figure 18A:
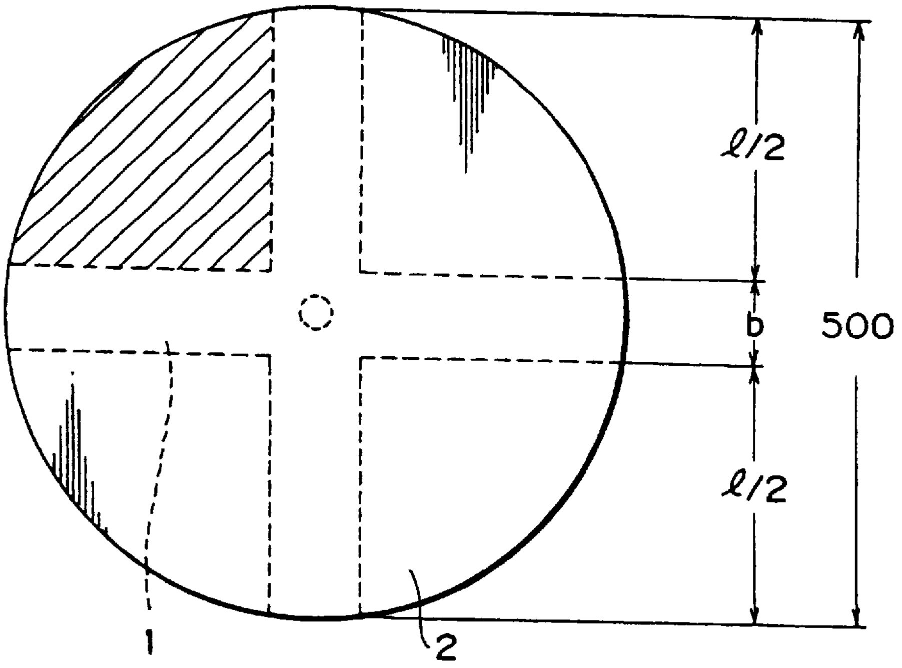
FIG. 18A and 18B are a plan view and a sectional view, respectively showing a second design example of an ink jet head based on the analysis of the model.
Figure 18B:
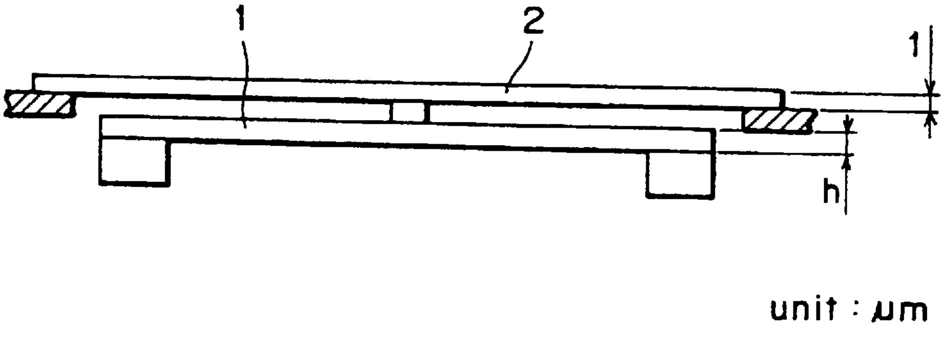

FIGS. 18A and 18B show dimensions of respective portions of an ink jet head according to a second design example. In this example, the number of sets of straight diametrical strip of the buckling structure 1 is two. The length (C) of each set of straight strips is fixed to 500 $\mu$m, and the value of the thickness h of the buckling structure 1 is optimum. The spring constant (k) of the circular diaphragm 2 having a radius of (r) is expressed as follows:

$$k=4\pi E_d h_d^3/3r^2(1-\nu_d^2)=15.5\text{N/m}$$

Figure 19:
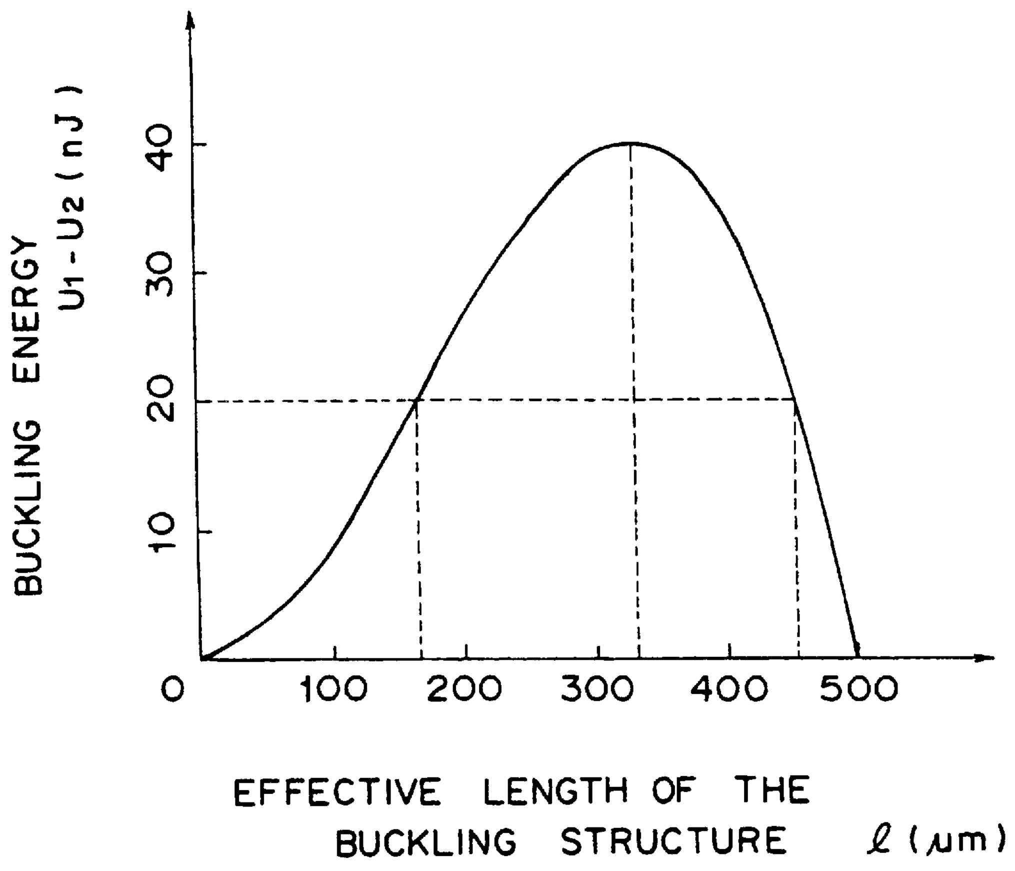
FIG. 19 is a graph showing the change in the buckling energy with respect to the change in the effective length of the buckling structure of the second design example, having an optimum thickness, shown in FIGS. 18A and 18B.

The change in the buckling energy ($U_1-U_2$) with respect to the change in the effective length (l) of the buckling structure 1 of the second design example is shown in FIG. 19. The range of the effective length (l) of the buckling structure 1 is required to be l<499 $\mu$m, based on equation (12) so as to obtain the buckling energy.

In order to allow the buckling energy to be more than twice as large as the energy required to discharge ink droplet, the range of the effective length (l) of the buckling structure 1 is required to be 167 $\mu$m<l<455 $\mu$m, based on equation (14).

Further, the optimum value hs of the effective length (l) of the buckling structure is: ls=331 $\mu$m, based on equation (13). Thus, it is preferable to design the length of the buckling structure in the vicinity of the optimum value hs.

Figure 20A:
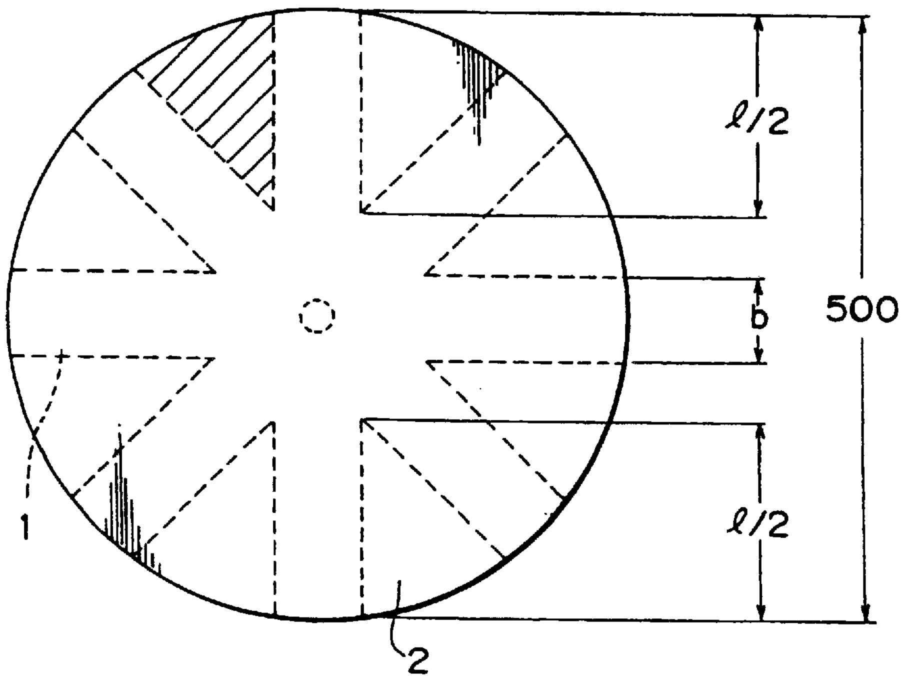
FIG. 20A and 20B are a plan view and a sectional view, respectively showing a third design example of an ink jet head based on the analysis of the model.
Figure 20B:
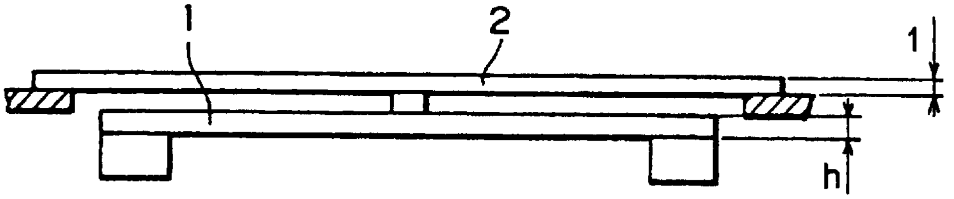

FIGS. 20A and 20B show dimensions of respective portions of an ink jet head according to a third design example. The construction of the ink jet head of this example is similar to that of the ink jet head of the second example except that the number of sets of straight diametrical strips of the buckling structure 1 is four. The spring constant (k) of the diaphragm 2 is also 15.5N/m.

Figure 21:
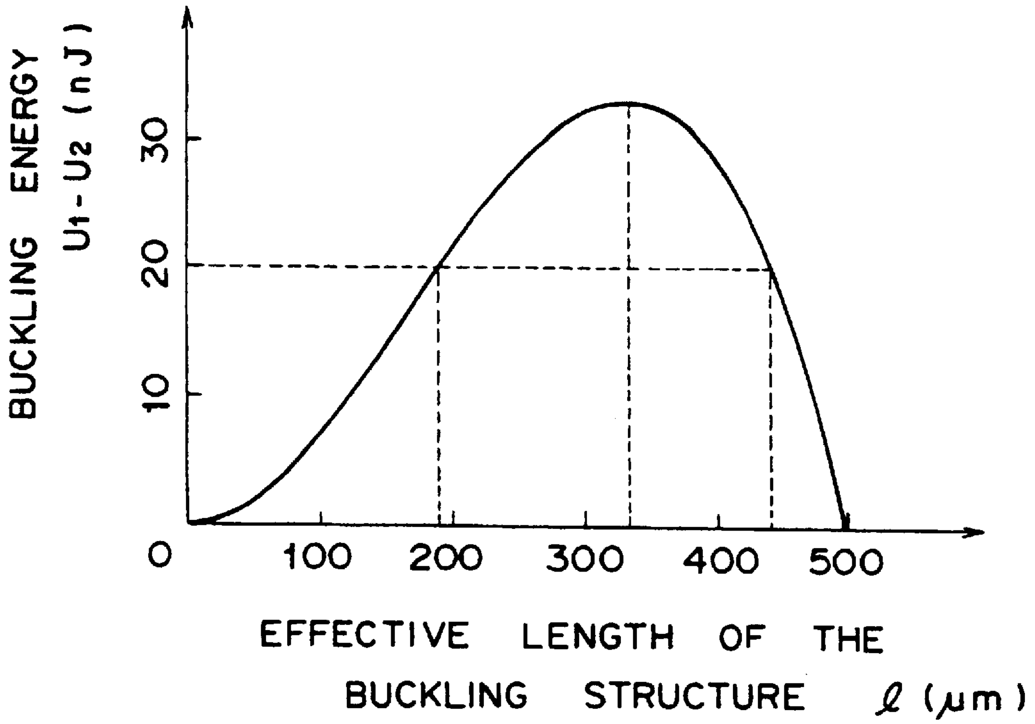
FIG. 21 is a graph showing the change in the buckling energy with respect to the change in the effective length of the buckling structure of the third design example shown in FIGS. 20A and 20B.

The change in the buckling energy ($U_1-U_2$) with respect to the change in the effective length (l) of the buckling structure 1 of the third design example is shown in FIG. 21. The range of the effective length (l) of the buckling structure 1 is required to be l<499 $\mu$m, based on equation (12) so as to obtain the buckling energy.

In order to allow the buckling energy to be more than twice as large as the energy required to discharge ink droplets, the range of the effective length (l) of the buckling structure 1 is required to be 186 $\mu$m<l<441 $\mu$m, based on equation (14).

Further, the optimum value hs of the effective length (l) of the buckling structure is: ls=331 $\mu$m, based on equation (13). Thus, it is preferable to design the length of the buckling structure in the vicinity of optimum value hs.

Based on FIGS. 19 and 21, supposing that the length (C) of the buckling structure is constant and that the thickness of the buckling structure is the optimum value hs, a large buckling energy can be allowed to be obtained when the number (n) of the buckling structures (sets of straight diametrical strips) is small. However, when ink is discharged, the diaphragm is pressed against the buckling structure by the pressure of the ink. Therefore, if the number (n) of the buckling structures is small, the area of one block of the diaphragm sandwiched between adjacent rectangular strips is large as shown by hatching in FIGS. 18A, 18B and 20A, 20B. Thus, it is to be noted that the longevity of the diaphragm becomes short because a large load is applied to the block.

In the embodiments, as the compression means, the electrodes 1*a* and 1*b* are provided at both ends of the buckling structure 1 to generate thermal stress in the buckling structure through the supply of electric current from the power source 9 via the switch 8. But the compression means of the present invention is not limited to these electrodes. For example, a compression means which mechanically applies a compression load exceeding a buckling load to the buckling structure so as to deform the buckling structure can be selected. The compression means thus allows ink to be discharged by pressurizing the ink in the ink chamber through the diaphragm.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An ink jet head comprising:

a container having an ink discharge opening on a wall thereof, the container defining an ink chamber therein;

a deformable buckling structure fixed to a wall surface inside the container;

a diaphragm disposed in the container spaced from the deformable buckling structure and forming a liquid-tight enclosure with the ink chamber, the diaphragm being deformable toward the ink chamber;

a connection member connecting a part of the deformable buckling structure with a part of the diaphragm, the connection member having a horizontal section smaller than the deformable buckling structure and the diaphragm; and a compression unit, provided in the container, that accumulates a compressive force in the deformable buckling structure and thereby buckles the deformable buckling structure toward the ink chamber so as to discharge ink in the ink chamber through the ink discharge opening.

2. The ink jet head according to claim 1, comprising a plurality of connection members.

3. The inkjet head according to claim 1, wherein the deformable buckling structure comprises a plurality of rectangular strips projecting radially from center of the deformable buckling structure, and wherein portions which form ends of the diaphragm in at least one direction are fixed to an inner wall of the container.

4. The ink jet head according to claim 2, wherein the deformable buckling structure comprises a plurality of rectangular strips projecting radially from a center of the deformable buckling structure, and wherein portions which form ends of the diaphragm in at least one direction are fixed to an inner wall of the container.

5. The ink jet head according to claim 1, wherein the diaphragm is not connected with any members other than the deformable buckling structure via the connection member.

6. The ink jet head according to claim 2, wherein the diaphragm is not connected with any members other than the deformable buckling structure via the connection member.

7. An ink jet head comprising:

a container having an ink discharge opening on a wall thereof, the container defining an ink chamber therein;

a buckling structure comprising at least two pairs of rectangular strips radially projecting from a center thereof, ends of which are fixed to a wall surface opposed to the wall of the container, the rectangular strips being deformable toward the ink discharge opening;

a diaphragm disposed spaced from the buckling structure and being fixed to an inner wall of the container, the diaphragm forming a liquid-tight enclosure with the ink chamber and partitioning the container into a buckling structure space and the ink chamber, wherein the buckling structure is deformable toward the ink chamber;

a connection member for connecting the diaphragm and the buckling structure at a center thereof; and a compression unit, provided in the buckling structure space, that causes the buckling structure to buckle by generating thermal stress therein with supply of electric current, so that ink is discharged from the ink discharge opening, wherein assuming that a Young's modulus of each rectangular strip constituting the buckling structure is E; a width thereof is b; a thickness thereof is h; a coefficient of linear expansion thereof is a; a length of a pair of rectangular strips is l; a total number of pairs of rectangular strips is n; a temperature change in the buckling structure at the time of buckling is t; and a spring constant of the diaphragm is k, the thickness (h) of the rectangular strip satisfies an equation expressed below to generate a buckling energy:

$$2l(-p)\cos(u/3+4\pi/3)<h<2l(-p)\cos(u/3)$$

where $$p=-\alpha t/\pi^2,\ q=3k/nEb\pi^4,\ u=\cos^{-1}\{q/p(-p)^{1/2}\},\ 0\leqq u\leqq\pi.$$

8. The ink jet head according to claim 7, wherein assuming that a surface tension of the ink is $\sigma$; a viscosity coefficient thereof is $\mu$; a mass of an ink droplet is m; a discharge speed thereof is v; a surface area thereof is S; and a length of the ink discharge opening is L, the thickness (h) of the rectangular strip satisfies an equation expressed below to generate a buckling energy ($U_1-U_2$) necessary for discharging the ink droplet:

$$U_1-U_2=(3nEbhl^2\alpha t\pi^2-nEbh^3\pi^4-6l^3k)^2/18nEbhl^3\pi^4>mv^2/2+\sigma S+8\pi\mu L^2v.$$

9. The ink jet head according to claim 8, wherein the thickness (h) of the rectangular strip is an optimum value hs expressed below to generate a maximum buckling energy necessary for discharging the ink droplet:

$$hs=l\{-s+(s^2+r^3)^{1/2}\}^{1/3}+l\{-s-(s^2+r^3)^{1/2}\}^{1/3};\ \text{when } s^2+r^3>0;$$
$$hs=2l(-r)\cos(w/3);\ \text{when } s^2+r^3<0$$

where $$r=\alpha t/5\pi^2,\ s=-3k/5nEb\pi^4,\ w=cos^{-1}\{s/r(-r)^{1/2}\},\ 0\leqq w\leqq\pi.$$

10. An ink jet head comprising:

a container having an ink discharge opening on a wall thereof, the container defining an ink chamber therein;

a buckling structure comprising at least two pairs of rectangular strips radially projecting from a center thereof, ends of which are fixed to a wall surface opposed to the wall of the container, the rectangular strips being deformable toward the ink discharge opening;

a diaphragm disposed spaced from the buckling structure and being fixed to an inner wall of the container, the diaphragm forming a liquid-tight enclosure with the ink chamber and partitioning the container into a buckling structure space and the ink chamber, wherein the buckling structure is deformable toward the ink chamber;

a connection member for connecting the diaphragm and the buckling structure at a center thereof; and a compression unit, provided in the buckling structure space, that causes the buckling structure to buckle by generating thermal stress therein with supply of electric current, so that ink is discharged from the ink discharge opening, wherein assuming that Young's modulus of each rectangular strip constituting the buckling structure is E; a width thereof is b; a thickness thereof is h; a coefficient of linear expansion thereof is $\alpha$; an entire length of a pair of rectangular strips is C; an effective length of a pair of rectangular strips excluding the center thereof is l; a total number of pairs of rectangular strips is n; a temperature change in the buckling structure at the time of buckling is t; and a spring constant of the diaphragm is k, the width (b) of the rectangular strip is given by an equation shown below; and the effective length (l) satisfies an equation expressed below to generate a buckling energy:

$$b=(C-l)/\tan\{(n-1)\pi/2n\}(3nEbhl^2\alpha t\pi^2-nEbh^3\pi^4-6l^3k)^2/3nEbhl^3\pi^4>0.$$

11. The ink jet head according to claim 10, wherein assuming that a surface tension of the ink is $\sigma$; a viscosity coefficient thereof is $\mu$; mass of an ink droplet is m; a discharge speed thereof is v; a surface area thereof is S; a length of the ink discharge opening is L, the effective length (l) satisfies an equation expressed below to generate a buckling energy ($U_1-U_2$) necessary for discharging the ink droplet:

$$(3nEbhl^2\alpha t\pi^2-nEbh^3\pi^4-6l^3k)^2/18nEbhl^3\pi^4>mv^2/2+\sigma S+8\pi\mu L^2v.$$

12. The ink jet head according to claim 11, wherein the effective length (l) satisfies an equation expressed below to generate a maximum buckling energy necessary for discharging the ink droplet:

$$d\{(3nEbhl^2\alpha t\pi^2-nEbh^3\pi^4-6l^3k)^2/18nEbhl^3\pi^4\}/dl=0.$$

* * * * *